United States Patent [19]

Leyrer et al.

[11] Patent Number: 5,069,991
[45] Date of Patent: Dec. 3, 1991

[54] PANCHROMATIC ELECTROPHOTOGRAPHIC RECORDING ELEMENT CONTAINING MULTIPLE CARRIER-PRODUCING SENSENTIZERS

[75] Inventors: Reinhold J. Leyrer, Ludwigshafen; Peter Neumann, Mannheim; Matthias Dust, Ludwigshafen, all of Fed. Rep. of Germany

[73] Assignee: BASF Aktiengesellschaft, Ludwigshafen, Fed. Rep. of Germany

[21] Appl. No.: 422,611

[22] Filed: Oct. 17, 1989

[30] Foreign Application Priority Data

Oct. 19, 1988 [DE] Fed. Rep. of Germany ....... 3835520

[51] Int. Cl.$^5$ .................. G03G 5/04; G03G 13/32
[52] U.S. Cl. ............................ 430/49; 430/57; 430/61; 430/78; 430/117
[58] Field of Search ............... 430/49, 58, 59, 77, 430/78, 57, 61, 117

[56] References Cited

U.S. PATENT DOCUMENTS 4,880,718 11/1989 Leyrev et al. .................. 430/58
4,906,541 3/1990 Dust et al. ..................... 430/49

Primary Examiner—John Goodrow
Attorney, Agent, or Firm—Keil & Weinkauf

[57] ABSTRACT

A novel panchromatic electrophotographic recording element has an electrically conducting substrate and one or more photoconducting layers. The photoconducting layer contains one or more binders, several charge carrier-producing compounds or sensitizers, one or more charge carrier-transporting compounds (photoconductors) and, if required, additives. The sensitizers themselves are Victoria Blue FB (C.I. 44045), Crystal Violet FN (C.I. 42555), Rhodamine FB (C.I. 45170), Astrazone Orange R (C.I. 48040) and/or Astrazone Orange G (C.I. 48035), which are used together with naphtholactam dyes and/or with isoindolenine dyes. The naphtholactam dyes have one or more chromophores of the general basic structure

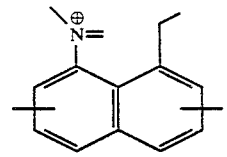

in the molecule, and the isoindolenine dyes have one or more chromophores of the general basic structure

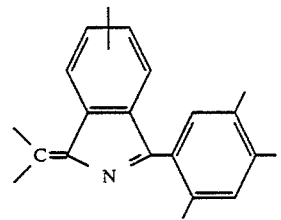

in the molecule.

20 Claims, No Drawings

PANCHROMATIC ELECTROPHOTOGRAPHIC RECORDING ELEMENT CONTAINING MULTIPLE CARRIER-PRODUCING SENSITIZERS

The present invention relates to a novel panchromatic electrophotographic recording element having an electrically conducting substrate and one or more photoconducting layers which contain one or more binders, several charge carrier-producing compounds or sensitizers, one or more charge carrier-transporting compounds (photoconductors) and, if required, additives.

The present invention furthermore relates to novel electrophotographic imaging processes which permit the exposure result to be visually checked in a simple manner.

Electrophotographic recording elements which have an electrically conducting substrate (A) and one or more photoconducting layers (B) are disclosed in, for example, EP-A-0 131 215, EP-B-0 031 481, EP-A-0 150 419, EP-A-0 162 216, EP-A-0 156 308, EP-A-0 131 292, EP-A-0 152 889 or EP-A-0 198 488. These recording elements are used for the production of offset printing plates or of printed circuits (printed circuit boards) or are employed for photocopying technology.

For this purpose, the photoconducting layer (B) of an electrophotographic recording element is given a positive or negative electric charge, for example by means of a corona discharge. Electrically charged photoconducting layer (B) is then exposed imagewise to actinic light, ultraviolet, visible or infrared light being suitable, depending on the sensitizer ($b_2$) used. The exposure causes the photoconducting layer (B) to become electrically conducting in its exposed areas, so that the previously generated electrostatic charge in these areas can flow away via the electrically conducting substrate (A). This produces a latent electrostatic image on the recording element, which image can be developed with the aid of suitable liquid or solid toners to give a visible image. This technique of imagewise information recording is generally referred to as xerography, the physical process on which the recording method is based also being known under the name Carlson process.

After toning of the electrostatic image, such a recording element can be further processed in various ways. For example, the toner image can be transferred from the recording element to another substrate, for example paper, and fixed there, so that a positive photocopy of the original image is obtained. This process can be carried out a smaller or greater number of times, depending on the life of the recording material. For the production of offset printing plates, on the other hand, the toner image is fixed on the photoconducting layer (B) itself by heating. The unexposed and therefore toner-free areas of the photoconducting layer (B) are then stripped or washed away with the aid of suitable developers. An offset printing plate produced in this manner, like offset printing plates produced in a conventional manner, generally accepts oily printing inks on its hydrophobic toner image areas and accepts water on its hydrophilic areas bared by stripping, so that it is suitable for offset printing processes. For the production of photoresist images, processes which correspond to the production process for the offset printing plates are used.

Important parameters which are known mainly to determine the reproduction quality of electrophotographic recording elements and their photoconducting layers (B) are very low conductivity in the dark, a high electrostatic charge capacity and high sensitivity to actinic light, coupled with good electrokinetic properties, which in general means a very rapid voltage drop during exposure, to or almost to the original electrostatic potential prior to charging. This voltage drop is also referred to as a photoinduced voltage drop or a photo drop for short. All these parameters determine from the outset whether an electrophotographic recording element gives high-contrast toner images which are true to the original even in the very fine image elements, in the shortest possible time.

In matching the important parameters to one another and to the actinic light source used for imagewise exposure of the photoconducting layer (B), the charge carrier-producing compounds or sensitizers ($b_2$) play a very decisive role. The importance of the sensitizers ($b_2$) which has always been considerable, has become even greater owing to the further development of conventional exposure sources and the development of new laser light sources. Progress in this area has now led to exposure units which permit rapid and exact imagewise exposure of electrophotographic recording elements with the aid of computer-controlled lasers. Semiconductor lasers, for example GaAlAs semiconductor lasers, which emit infrared light, or AlGaInP semiconductor lasers, which emit visible light, are often used for this purpose, owing to the cost-efficiency and the simple method of production. To allow the advantages of this promising exposure method to be fully utilized, it is however essential for the electrophotographic recording elements to have a property profile which the conventional recording elements cannot offer at the required level or cannot provide at all. In particular, because of the short laser pulses and the comparatively low photon energy in the red and infrared ranges, absorption of the light energy by the photoconducting layer (B) and the resulting photoinduced drop must take place particularly rapidly, i.e. within nanoseconds, and the law $$I \cdot t = \text{constant}$$

(I=light intensity; t=time)
must be applicable in this time interval too.

However, these stringent requirements, if they have been met at all to date, have not been me to the desired extent by the known electrophotographic recording elements which contain, as sensitizers, one or more dyes from the classes consisting of the triarylmethanes, xanthenes, cyanines, azo dyes, phthalocyanines, isoindolines or perylenetetracarboxylic acid derivatives. Accordingly, the known electrophotographic recording elements frequently have to be exposed in the conventional manner in order to obtain good reproduction quality, the particular advantages of the laser exposure method, in particular those obtained with semiconductor lasers, being lost. Hence, the known electrophotographic recording elements are suitable only to a very restricted extent, if at all, for the production of economical, long-lasting, rapidly responding photocopiers operating with laser exposure and for the production of high quality offset printing plates which provide copies true to the original and stable over the print run, and high quality photoresist images which are true to the original and resistant to etchants, by the laser exposure method. These disadvantages are of course also evident in the products which it is finally intended to produce from the known electrophotographic recording elements with the aid of laser exposure. Thus, the relevant photocopies or the printed products are not only of poorer quality but are also obtainable only in a comparatively small number of copies, and electrical circuits produced using the known electrophotographic photoresists often have so many reproduction errors that they no longer meet practical requirements.

Moreover, the electrophotographic recording elements known to date and the electrophotographic imaging methods known to date do not permit visual checking of the toned charge image before it is fixed or before it is transferred to another surface, and this is a disadvantage.

It is an object of the present invention to provide a novel electrophotographic recording element which no longer has the disadvantages of the known electrophotographic recording element. In particular, the novel electrophotographic recording element should not only have an excellent reprographic property profile in imagewise exposure to ultraviolet or visible light but also be accessible to imagewise exposure to red or infrared light, in particular to red or infrared laser light, and give excellent photocopies, offset printing plates and photoresist images.

Furthermore, the novel electrophotographic recording element should be sensitized so that it is panchromatic and should permit visual checking of the toned charge image before it is fixed or before it is transferred to another surface.

It is a further object of the present invention to provide novel electrophotographic imaging methods in which the toned charge image can be visually checked in a simple manner before being fixed or before being transferred to another surface.

We have found that these objects are achieved in a surprising manner by an electrophotographic recording element of the type defined at the outset which, in addition to one or more specially selected sensitizers from the group consisting of the triarylmethane, xanthene and cyanine dyes, also contains one or more further sensitizers from the group consisting of the naphtholactam and isoindolenine dyes.

The present invention accordingly relates to a panchromatic electrophotographic recording element comprising A) an electrically conducting substrate and
B) one or more photoconducting layers which contain
  (b₁) one or more binders,
  (b₂) several charge carrier-producing compounds or sensitizers from the group consisting of the triarylmethane, xanthene and cyanine dyes,
  (b₃) one more charge carrier-transporting compounds (photoconductors) and, if required,
  (b₄) additives, wherein the charge carrier-producing compounds or sensitizers (b₂) used here are Victoria Blue FB (C.I. 4045), Crystal Violet FN (C.I. 42555), Rhodamine FB (C.I. 45170), Astrazone Orange R (C.I. 48040) and/or Astrazone Orange G (C.I. 48035), together with naphtholactam dyes which contain one or more chromophores of the general basic structure

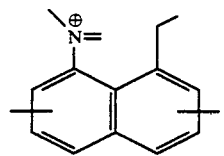

and/or with isoindolenine dyes which contain one or more chromophores of the general basic structure

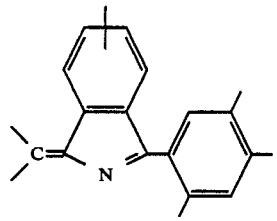

We have furthermore found novel and particularly advantageous electrophotographic imaging methods which permit toned charge images to be checked visually before being fixed or before being transferred to another surface. These novel imaging methods are described in detail below.

An important component of the novel panchromatic electrophotographic recording element is the novel photoconducting layer (B).

The novel photoconducting layer (B) contains, as the essential components, one or more binders (b₁), several charge carrier-producing compounds or sensitizers (b₂) and one or more charge carrier-transporting compound(s) pound(s) or photoconductors (b₃) or consists of these essential components.

The novel photoconducting layer (B) may contain these essential components together side by side.

However, these essential components may be present separately from one another in separate individual layers, i.e. the novel photoconducting layer (B) may also be a double or multiple layer. For example, the sensitizers (b₂) may be present in one or more separate sensitizer layers (b₂), in addition to a layer of binders (b₁) and photoconductors (b₃) and, if required, any additives (b₄). Furthermore, the photoconductors (b₃) may also be contained in a separate photoconductor layer (b₃), whereas the sensitizers (b₂) together with the binders (b₁) and, if required, the additives (b₄) form a further separate individual layer. In accordance with their function, these double or multiple layers are referred to below as novel photoconducting multiple layers (B) for short.

The particular novel photoconducting layer (B) selected for producing the novel recording elements depends primarily on the intended use of the recording elements.

Those components of the novel photoconducting layer (B) which are essential to the invention are the sensitizers (b₂).

These are, on the one hand, the specially selected dyes Victoria Blue FB (C.I. 44045), Crystal Violet FN (C.I. 42555), Rhodamine FB (C.I. 45170), Astrazone Orange R (C.I. 48040) and or Astrazone Orange G (C.I. 48035), one of which or two, three, four or all five together can be used as sensitizers (b₂).

On the other hand, they are naphtholactam dyes which contain one or more chromophores of the general basic structure

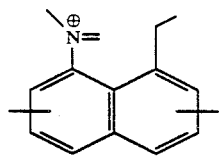

and isoindolenine dyes which contain one or more chromophores of the general basic structure

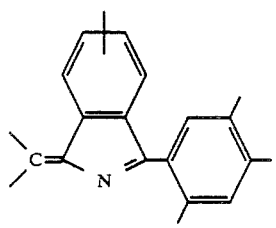

These dyes are each used individually or as a mixture together with the abovementioned sensitizers (b₂).

Advantageous dyes are the naphtholactam dyes of the general formula I

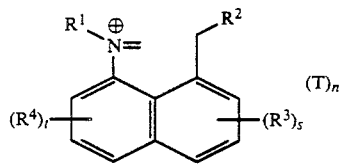

where $R^1$ is $C_1$-$C_{22}$-alkyl, $C_5$-$C_7$-cycloalkyl, ω-aryl-$C_1$-$C_6$-alkyl, aryl or $C_3$-$C_{15}$-alkylene; $R^1$ is $C_6$- or $C_7$-cycloalkyl, ω-aryl-$C_1$-$C_6$-alkyl, aryl, $C_3$-$C_{15}$-alkylene or $C_1$-$C_{22}$-alkyl which is substituted by halogen, hydroxyl, amino, thiolo, cyano and/or oxo groups, by alkyl, cycloalkyl, aryl and/or arylalkyl oxy radicals, by alkyl, cycloalkyl, aryl and/or arylalkylamino radicals, by alkane, cycloalkane, arylalkane and/or aromatic carbonyloxy radicals, by alkane, cycloalkane, arylalkane and/or aromatic carbonylamino radicals, by alkylidene, cycloalkylidene and/or arylalkylideneimino radicals and/or by carboxylic acid groups, phosphonic acid groups and/or sulfo groups, or $R^1$ is a radical of the general formula II

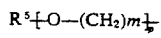

where $R^5$ is hydrogen, $C_1$-$C_6$-alkyl or $C_6$-$C_{10}$-aryl and m is an integer from 2 to 4 and, independently of this, p is an integer from 1 to 10; $R^2$ is a radical of the general formula III

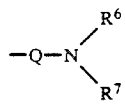

where $R^6$ and $R^7$ are identical or different and are each hydrogen, a radical $R^1$ or an alkyl alkan-1-yl- ω-carboxylate radical and Q is 1,4-phenylene, 2-alkyl-1,4-phenylene or 1,4-naphthylene; $R^2$ is a radical of the general formula IV $$-Q-R^8 \qquad \text{IV}$$

where $R^8$ is a substituted or unsubstituted, monocyclic or fused heterocyclic radical from the class consisting of the azoles, the azolines, the azolidines, the partially or completely hydrogenated azoles and the partially or completely hydrogenated azepines, which heterocyclic radical is bonded to Q via a ring nitrogen atom, and Q has the meanings stated for the general formula III; $R^2$ is a substituted or unsubstituted, monocyclic or fused heterocyclic radical from the class consisting of the azoles, the azolines, the partially hydrogenated azines and the azines, which heterocyclic radical is bonded to the naphtholactam basic structure via a ring carbon atom, and $R^2$ is a radical of the general formula V

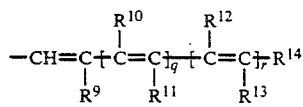

where q is 0 or 1;

r, independently of q, is 0, 1 or 2;

$R^9$ and $R^{11}$ are each hydrogen or, where q is 1, together form an unsubstituted or $C_1$-$C_4$-alkyl-substituted $C_2$- or $C_3$-alkanediyl chain or one or two carbonyl group(s); $R^{10}$, $R^{12}$ and $R^{13}$ are each hydrogen, halogen, cyano, nitro, hydroxyl, a radical $R^1$, $C_1$-$C_6$-alkoxy, $C_5$-$C_7$-cycloalkoxy, $C_6$-$C_{10}$-aryloxy, ω-phenyl-$C_1$-$C_6$-alkyloxy, $C_1$-$C_6$-alkoxy, $C_5$-$C_7$-cycloalkoxy, $C_6$-$C_{10}$-aryloxy or ω-phenyl-$C_1$-$C_6$-alkoxycarbonyl, $C_1$-$C_6$-alkylamino, $C_5$-$C_7$-cycloalkylamino, $C_6$-$C_{10}$-arylamino or ω-phenyl-$C_1$-$C_6$-alkylaminocarbonyl or a substituted or unsubstituted, monocyclic or fused heterocyclic radical from the class consisting of the azoles, the thiols, the azolines, the azines and the partially or completely hydrogenated azines, and $R^{10}$, $R^{12}$ and $R^{13}$ may be identical or different;

$R^{14}$ is a radical $R^2$ of the general formula III;

$R^{14}$ is a radical $R^2$ of the general formula IV;

$R^{14}$ is a substituted or unsubstituted, monocyclic or fused heterocyclic radical from the class consisting of the azoles, the thiols, the azolines, the azolidenes, the azines, the partially or completely hydrogenated azines and the thienes, which heterocyclic radical is bonded to the radical of the general formula V by a ring carbon atom, and $R^{14}$ is a radical of the general formula VI

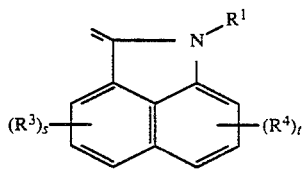

where $R^1$ has the abovementioned meanings and $R^3$, $R^4$, s and t have the meanings given below;

$R^2$ is a radical of the general formula VII

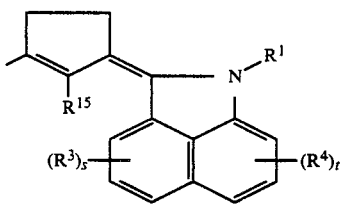

where $R^1$ has the abovementioned meanings, $R^3$, $R^4$, s and t have the meanings given below and $R^{15}$ is a radical of a CH-acidic compound;

s is 1, 2 or 3;

t, independently of s, is 1, 2 or 3; $R^3$ and $R^4$ are each a radical $R^{10}$, $R^{12}$, $R^{13}$ or $R^1$, a carboxylic acid group, sulfo group or phosphonic acid group, $C_1$–$C_6$-alkyl-, $C_5$–$C_{10}$-cycloalkyl-, $C_6$–$C_{10}$-aryl- or ω-phenyl-$C_1$–$C_6$-alkylthio, -alkoxysulfonyl, -alkylsulfonyl or -alkyloxycarbonylaminyl, N,N-dialkyl-, N,N-diaryl-, N-alkyl-N-aryl-, N,N-di-(ω-arylalkyl)-, N-alkyl- N-(ω-arylalkyl)-, N-aryl-N-(ω-arylalkyl)-, N,N-dicycloalkyl-, N-cycloalkyl-N-alkyl-, N-cycloalkyl-N-aryl- or N-cycloalkyl-N-(ω-arylalkyl)-amino, -aminosulfonyl or -aminocarbonyl and, where s is 2 or 3, t is 2 or 3 or s and t are each 1, 2 or 3, a carbon, nitrogen, oxygen or sulfur atom which is part of the skeleton of one or more rings fused to the naphth-1,8-ylene group, and $R^3$ and $R^4$ may be identical or different;

T is an anion and n is 0 or ⅓, ½, ⅔, 1, 2 or 3.

Examples of suitable radicals $R^1$ of the general formula I are methyl, ethyl, propyl, butyl, pentyl, isopropyl, isobutyl, sec-butyl, tert-butyl, hexyl, heptyl, octyl, nonadecyl, eicosanyl, heneicosanyl, docosanyl, cyclopentyl, cyclohexyl, 2-, 3- and 4-methylcyclohexyl, cyclopentyl, 2,3-, 2,4-, 2,5- and 3,4-dimethylcyclopentyl, phenylmethyl, 2-phenyleth-1-yl, 2-(1'-naphthyl)-eth-1-yl, 3-phenylprop-1-yl, 3-(4'-methylphen-1'-yl)-prop-1-yl, 4-phenylbut-1-yl, 5-phenylpent-1-yl, 6-phenylhex-1-yl, phenyl, 4-methylphen-1-yl, naphthalin-1-yl, anthracen-1-yl, phenanthren-1-yl, prop-2-en-1-yl, but-3-en-1-yl, pent-4-en-1-yl, hex-5-en-1-yl, hept-6-en-1-yl, oct-7-en-1-yl, non-8-en-1-yl, dec-9-en-1-yl, undec-10-en-1-yl, dodec-11-en-1-yl, pentadec-14-en-1-yl, trifluoromethyl, 2,2,2-trifluoroeth-1-yl, perfluoroprop-1-yl, 2-chloroeth-1-yl, 3-chlorobut-1-yl, 4-chlorocyclohex-1-yl, 2- and 4-chlorophen-1-yl, 4-trifluoromethylphen-1-yl, 2,4-dichlorophen-1-yl, 4'-chlorophenylmethyl, 2-(4'-chlorophen-1'-yl)-eth-1-yl, 4-chlorohex-5-en-1-yl, 2-hydroxyeth-1-yl, 2-hydroxyprop-1-yl, 3-hydroxyprop-1-yl, 2-hydroxybut-1-yl, 2,3-dihydroxyprop-1-yl, 8-hydroxyoct-1-yl, 9-hydroxydec-1-yl, 2-hydroxycyclopent-1-yl, 4-hydroxycyclohex-1-yl, 4-hydroxyphenylmethyl, 2-(4'-hydroxyphen-1'-yl)-eth-1-yl, 3-(4'-hydroxyphen-1'-yl)-eth-1-yl, 4-hydroxyphen-1-yl, 2,4-dihydroxyphen-1-yl, 4-hydroxynaphth-1-yl, 3-hydroxypent-5-en-1-yl, 2-amino-eth-1-yl, 3-aminoprop-1-yl, 4-aminobut-1-yl, 5-aminopent-1-yl, 6-aminohex-1-yl, 2-aminocyclopent-1-yl, 4-amino-cyclohex-1-yl, 4-aminophenylmethyl, 2-(4'-aminophen-1'-yl)-eth-1-yl, 3-(4'-aminophen-1'-yl)-prop-1-yl, 2-aminophenyl, 4-aminophenyl, 3-aminohex-5-en-1-yl, 4-thiolobut-1-yl, 4-thiolocyclohex-1-yl, 2-(4'-thiolophen-1'-yl)-eth-1-yl, 4-thiolophen-1-yl, 5-thiolodec-9-en-1-yl, cyanomethyl, 2-cyanoeth-1-yl, 3-cyanoprop-1-yl, 4-cyanobut-1-yl, 5-cyanopent-1-yl, 6-cyanohex-1-yl, 11-cyanoundec-1-yl, 12-cyanododec-1-yl, 13-cyanotridec-1-yl, 17-cyanoheptadec-1-yl, 18-cyanooctadec-1-yl, 4-cyanocyclohex-1-yl, 4-cyanophenylmethyl, 2-(4'-cyanophen-1'-yl)-eth-1-yl, 3-(4'-cyanophen-1'-yl)-prop-1-yl, 4-cyanophen-1-yl, 4-chloro-2-cyanophen-1-yl, 2,4-dicyanophen-1-yl, 3,3-dicyanoprop-2-en-1-yl, 1-oxoeth-1-yl, 1-oxoprop-1-yl, 2-oxoprop-1-yl, 2-oxoeth-1-yl, 3-oxobut-1-yl, 7-oxodec-1-yl, 4,6-dimethyl-3,5-dioxohex-1-yl, 2-oxo-3-(4'-hydroxyphen-1'-yl)-prop-1-yl, 2-oxo-3-(4'-trifluorophen-1'-yl)-prop-1-yl, 2-methoxyeth-1-yl, ethoxymethyl, 2-methoxyprop-1-yl, 4-methoxybut-1-yl, 6-methoxyhex-1-yl, 7-ethoxyhept-1-yl, 2,4,7-trimethoxydec-1-yl, 6-ethyl-4-oxadec-1-yl, 20-ethoxyeicosan-1-yl, 2-butoxyeth-1-yl, 2-benzyloxyeth-1-yl, 3-methoxycyclopentyl, 3,4-dimethoxycyclopentyl, 4-methoxycyclohexyl, cyclohexyloxymethyl, 2-phenyloxyeth-1-yl, 3-phenyloxyprop-1-yl, 10-phenyloxydec-1-yl, (4'-methoxyphen-1'-yl)-methyl, 2'-(4'-methoxyphen-1'-yl)-eth-1-yl, 3-(3',4',4'-trimethoxyphen-1'-yl)-prop-1-yl, 2-[4'-(phenyloxy)-phen-1'-yl]-eth-1-yl, 2- and 4-methoxyphen-1-yl, 4-ethoxyphen-1-yl, 2,4-dimethoxyphen-1-yl, 4-nonyloxyphen-1-yl, 4-undecyloxyphen-1-yl, 4-dodecyloxyphen-1-yl, 4-hexadecyloxyphen-1-yl, 4-octadecyloxy-phen-1-yl, 3-octadecyloxyphen-1-yl, 4-eicosanyloxyphen-1-yl, 2,3,6,7-tetramethoxynaphth-1-yl, 4-(4'-methylphenyloxy)-phen-1-yl, 4'-[4'-(4''-phenyloxy)phen-1'-yl]-phen-1-yl, N,N-dimethylaminomethyl, 3-azapent-1-yl, 5-amino-3-azapent-1-yl, 5-N,N-dihexylamino-3-azapent-1-yl, 7-azapentacosan-1-yl, 3,6-diazaoct-1-yl, 4-N,N-dioctylaminobut-1-yl, 6-N,N-dioctadecylaminohex-1-yl, 18-N,N-dimethylaminooctadec-1-yl, 2-N-phenylaminoethyl, 3-(4'-N,N-dimethylaminophenylamino)-prop-1-yl, 4-N,N-dimethylaminocyclohex-1-yl, 6-N-benzylaminohex-1-yl, 4-N,N-dimethylaminophen-1-yl, 4-N-methyl-N-octadecylaminophen-1-yl, 4-N-phenylaminophen-1-yl, 4-N-benzylaminophen-1-yl, 3-N,N-dimethylaminohex-5-en-1-yl, methanecarbonyloxymethyl, 2-(methanecarbonyloxy)-eth-1-yl, 2-(ethanecarbonyloxy)-eth-1-yl, 2-(propanecarbonyloxy)-eth-1-yl, 3-(butanecarbonyloxy)-prop-1-yl, 6-(cyclohexanecarbonyloxy)-hex-1-yl, 4-(methanecarbonyloxy)-cyclohex-1-yl, 12-(benzenecarbonyloxy)-dec-1-yl, 4-(benzenecarbonyloxy)-benzyl, 2-[4'-(methanecarbonyloxy)-phen-1'-yl]-eth-1-yl, 3-[4'-propanecarbonyloxy)-phen-1'-yl]-prop-1-yl, 4-(methanecarbonyloxy)-phen-1-yl, 4-(ethanecarbonyloxy)-naphth-1-yl, 4-(heptadecanecarbonyloxy)phen-1-yl, 4-(cyclohexanecarbonyloxy)-phen-1-yl, 5-(methanecarbonyloxy)-oct-7-en-1-yl, methanecarbonylaminomethyl, 2-(methanecarbonylamino)-eth-1-yl, 3-(butanecarbonylamino)-prop-1-yl, 8-(cyclohexanecarbonylamino)oct-1-yl, 2-(benzenecarbonylamino)-eth-1-yl, 4-(phenylmethanecarbonylamino)-cyclohex-1-yl, 2-[4'-(methanecarbonylamino)-phen-1'-yl]-eth-1-yl, 4-(methanecarbonylamino)-phen-1-yl, 4-(benzenecarbonylamino)-phen-1-yl, 4-(heptadecanecarbonylamino)-phen-1-yl, 4-azahex-4-en-1-yl, 2-(cyclohexylideneimino)-eth-1-yl, 2-(benzylideneimino)-eth-1-yl, 4-(cyclohexylideneimino)-cyclohex-1-yl, 4-(benzylideneimino)-phen-1-yl, 2-[4'-(benzylideneimino)phen-1'-yl]-eth-1-yl, 2-carboxyeth-1-yl, 3-carboxyprop-1-yl, 4-carboxyhex-1-yl, 17-carboxyheptadec-1-yl, 5,6-dicarboxyhex-1-yl, 2-carboxycyclopent-1-yl, 4-carboxycyclohex-1-yl, 2-(4'-carboxyphen-1'-yl)-eth-1-yl, 3-(3'-hydroxy-4'-carboxyphen-1'-yl)-prop-1-yl, 4-carboxyphen-1-yl, 3,4-dicarboxyphen-1-yl, 6,7-dicarboxynaphth-1-yl, 4-carboxyhex-5-en-1-yl, 2-sulfoeth-1-yl, 3-sulfoprop-1-yl, 4-sulfobut-1-yl, 12-sulfododec-1-yl, 14-sulfotetradec-1-yl, 16-sulfohexadec-1-yl, 13-sulfooctadec-1-yl, 4-sulfocyclohex-1-yl, 8-(4′-sulfophen-1′-yl)-oct-1-yl, 4-sulfophen-1-yl, 3,4-disulfophen-1-yl,2-sulfonaphth-1-yl, 2,6-disulfonaphth-1-yl, 6,7-disulfonaphth-1-yl, 2-sulfobut-3-en-1-yl, 2-phosphonyleth-1-yl, 4-phosphonylcyclohex-1-yl, 4-phosphonylphen-1-yl, 3-oxa-5-hydroxypent-1-yl, 3,6-dioxahept-1-yl, 3,6-dioxaoct-1-yl, 3,6-dioxadec-1-yl, 3,6-dioxadodec-1-yl, 3,6-dioxa-6-phenylhex-1-yl, 3,6-dioxa-7-phenylhept-1-yl, 3,6,9-trioxadec-1-yl, 3,6,9-trioxaundec-1-yl, 3,6,9-trioxatridec-1-yl, 3,6,9-trioxa-10-phenyldec-1-yl, 8-hydroxy-3,6-dioxaoct-1-yl, 8-(phenyloxy)-3,6-dioxaoct-1-yl, 3,6,9,12,15-pentaoxahexadecyl-1-yl, 4,8-dioxaundec-1-yl, 4-oxa-8-hydroxyoct-1-yl, 4,8,12-trioxatridec-1-yl, 4,8,12-trioxaoctadec-1-yl and 4,8,12,16-tetraoxaheptadec-1-yl.

Examples of particularly advantageous radicals R$^1$ in naphtholactam dyes of the general formula I are methyl, ethyl, hexyl, dodecyl, docosanyl, phenylmethyl, 2-butoxyeth-1-yl, (=3-oxahept-1-yl), 3,6-dioxahept-1-yl, 3,6-dioxaoct-1-yl, 3,6-dioxadec-1-yl, 3,6-dioxadodec-1-yl, 3,6,9-trioxadec-1-yl, 3,6,9-trioxatridec-1-yl and undec-10-en-1-yl.

Examples of suitable radicals R$^6$ and R$^7$ in radicals R$^2$ of the general formula III are the abovementioned radicals R$^1$, of which methyl, ethyl, propyl, butyl, pentyl, hexyl, isopropyl, isobutyl, sec-butyl, tert-butyl, 2-chloroeth-1-yl, 2-hydroxyeth-1-yl, 2-hydroxyprop-1-yl, 2-hydroxybut-1-yl, 4-chlorophen-1-yl, 2-chlorophen-1-yl, 2-methylphen-1-yl, 4-methylphen-1-yl, 2-cyanoeth-1-yl, 2-methoxyphen-1-yl, 4-methoxyphen-1-yl, 2-(methanecarbonyloxy)-eth-1-yl, 2-(ethanecarbonyloxy)-eth-1-yl, 2-(propanecarbonyloxy)-eth-1-yl, 2-(butanecarbonyloxy)-eth-1-yl, prop-2-en-1-yl, but-3-en-1-yl, pent-1-en-4-yl, hex-5-en-1-yl, hept-6-en-1-yl, oct-7-en-1-yl, non-8-en-1-yl, dec-9-en-1-yl and undec-10-en-1-yl are preferred; or hydrogen or methyl, ethyl, propyl or butyl eth-1-yl-2-carboxylate groups. Of all these, hydrogen, methyl, ethyl, butyl, phenyl and 4-ethoxyphen-1-yl are very particularly preferred.

Examples of suitable groups Q in radicals R$^2$ of the general formulae III and IV are 1,4-phenylene, 2-methylphen-1,4-ylene, 2-ethylphen-1,4-ylene or 1,4-naphthylene, of which 1,4-phenylene is very particularly preferred.

Examples of suitable radicals R$^8$ in radicals R$^2$ of the general formula IV are pyrrol-1-yl, imidazol-1-yl, pyrazol-1-yl, indol-1-yl, 1H-indazol-1-yl, purin-7-yl, carbazol-9-yl, β-carbolin-9-yl, $\Delta^2$- and $\Delta^3$-pyrrolin-1-yl, $\Delta^2$-, $\Delta^3$- and $\Delta^4$-pyrazolin-1-yl, and $\Delta^2$-, $\Delta^3$- and $\Delta^4$-imidazolin-1-yl, indolin-1-yl, isoindolin-1-yl, $\Delta^2$-3-methylpyrazolin-1-yl, $\Delta^2$-3,5,5-trimethylpyrazolin-1-yl, $\Delta^2$-3-methyl-5-phenylpyrazolin-1-yl, $\Delta^2$-3,5-diphenylpyrazolin-1-yl, pyrrolidin-1-yl, imidazolidin-1-yl, pyrazolidin-1-yl, 1,2-oxazolidin-1-yl, 1,2-thiazolidin-1-yl, 1-piperidino, morpholin-4-yl, piperazin-1-yl, 4-methylpiperazin-1-yl, phenoxazin-10-yl, phenothiazin-10-yl, perimidin-1-yl, perhydrophenazin-5-yl, $\Delta^3$, $\Delta^5$-1,3-diazepin-1-yl and perhydro-1,3-diazepin-1-yl. Of these, pyrrolidin-1-yl, 1-piperidino, morpholin-1-yl, 4-methylpiperazin-1-yl, pyrazolidin-1-yl, $\Delta^2$-3-methylpyrazolin-1-yl, $\Delta^2$-3,5,5-trimethylpyrazolin-1-yl, $\Delta^2$-3-methyl-5-phenylpyrazolin-1-yl and $\Delta^2$-3,5-diphenylpyrazolin-1-yl are very particularly preferred.

Examples of very particularly advantageous radicals R$^2$ of the general formulae III and IV are accordingly 4-N,N-dimethylamino-, 4-N,N-diethylamino-, 4-N,N-dibutylamino-, 4-N-ethyl-N-methylamino-, 4-N-phenylamino-, 4-N,N-diphenylamino- and 4-[N-(4′-ethoxyphen-1′-yl)-N-methylaminophen-1′-yl; or 4-(pyrrolidin-1′-yl)-, 4-(1′-piperidino)-, 4-morpholin-1′-yl)-, 4-(4′-methylpiperazin-1′-yl)-, 4-(pyrazolidin-1′-yl)-, 4-($\Delta^{2'}$-3′-methylpyrazolin-1′-yl)-, 4-(2′-3′,5′,5′-trimethylpyraolin-1′-yl)-, 4-($\Delta^{2'}$-3′-methyl-5′-phenylpyrazolin-1-yl)-and 4-($\Delta^{2'}$-3′,5′-diphenylpyrazolin-1′-yl)-phen-1-yl.

Examples of suitable radicals R$^2$ of the general formula I which are substituted or unsubstituted, monocyclic or fused heterocyclic radicals from the class consisting of the azoles, the azolines, the partially hydrogenated azines and the azines, the said heterocyclic radicals being bonded to the naphtholactam structure via a ring carbon atom, are N-methylpyrrol-2-yl, N-ethyl-3-phenylpyrrol-2-yl, N-methyl-4-phenylimidazol-2-yl, N-phenyl-3,5,5-trimethylpyrazol-1-yl, 5-methyl-2-phenyl-1,3-oxazol-4-yl, 4-N,N-dimethylamino-1,3-oxazol-2-yl, 5-N,N-diethylamino-1,3,4-oxadiazol-2-yl, 5-N,N-diphenylamino-1,3,4-oxadiazol-2-yl, 4-phenyl-1,3-thiazol-5-yl, 4-phenyl-2-N,N-dimethylamino-1,3-thiazol-5-yl, 4-phenyl-2-N,N-diethylamino-1,3-thiazol-5-yl, 4-phenyl-1,3-thiazol-2-yl, 2-phenyl-1,3-thiazol-4-yl, 2,4-diphenyl-1,3-thiazol-5-yl, 4-(naphth-1′-yl)-1,3-thiazol-5-yl; 4-(4′-methylphen-1′-yl)-2-N,N-dimethylamino-, -2-N,N-diethylamino-, -2-N-ethyl-N-phenylamino- and -2-N,N-diphenylamino-1,3-thiazol-5-yl; 4-(naphth-1′-yl)-2-N,N-dicyclohexylamino-, -2-N,N-di(phenylmethyl)amino-, -2-N-phenyl-N-(phenylmethyl)amino-, -2-N-cyclohexyl-N-(phenylmethyl)amino-and -2-piperidino-1,3-thiazol-5-yl; 4-(4′-nitrophen-1′-yl)-2-N,N-dimethylamino-and -2-N,N-diethylamino-1,3-thiazol-5-yl; 4-(4′-chlorophen-1′-yl)-2-N,N-diethylamino-, -2-N,N-dicyclopentylamino, -2-N-[2′-(4′-methylphen-1″-yl)eth-1′-yl]-N-methylamino-and -2-N,N-di-n-hexylamino-1,3-thiazol-5-yl; 4-[4′-(but-1″-oxy)-phen-1′-yl]-2-N,N-di-n-hexylamino-1,3-thiazol-5-yl, 4-(2′,4′-dimethylphen-1′-yl)-2-($\Delta^{2'}$-3′,5′,5′-trimethylpyrazolin-1′-yl)-1,3-thiazol-5-yl, 4-phenyl-2-(4′-methylpiperazin-1′-yl)-1,3-thiazol-5-yl, 4-(2′,4′,6′-trichlorophen-1′-yl)-2-(pyrrolidin-1′-yl)-1,3-thiazol-5-yl, 4-(4′-bromophen-1′-yl)-2-N,N-diphenylamino-1,3-thiazol-5-yl, 4-(naphth-2′-yl)-2-N,N-diethylamino-1,3-thiazol-5-yl, 4-phenyl-2-N-methyl-N-(4′-ethoxyphen-1′-yl)-amino-1,3-thiazol-5-yl, 2-N,N-diethylamino-1,3-thiazol-5-yl, N-ethylcarbazol-2-yl, N-propylisoindolin-5-yl, N-methylindol-3-yl, N-methyl-2-phenylindol-3-yl, N-hexylindol-3-yl, N-methyl-5-chloroindol-3-yl, N-methyl-1H-indazol-5-yl, pyridin-2-yl, pyrimidin-2-yl, pyridin-4-yl, pyridin-3-yl, pyrazin-2-yl, pteridin-2-yl, acridin-3-yl, 1,7-phenanthrolin-3-yl, pyridazin-3-yl, phenazin-1-yl, N-methylphenoxazin-2-yl, N-phenylphenothiazin-3-yl, N-ethylperimidin-4-yl, 1-ethyl, 1-(2′-hydroxyethyl)-, 1,2,2,4-tetramethyl-, 2,2,4-trimethyl-1-ethyl-, 2,2,4-trimethyl-1-(2′-methoxyethyl)-and 2,2,4-trimethyl-(2′-methanecarbonyloxy)-benzopiperidin-6-yl; 4-(2′-hydroxyethyl)-and 4-[2′-(prop-2″en-1″-yloxy)-eth-1′-yl]-benzomorpholin-6-yl; 4H-quinolizin-2-yl, isoquinolin-3-yl, quinolin-2-, -3-, -6- and -8-yl; phthalazin-1-yl, 1,8-naphthyridin-2- and -5-yl, quinoxalin-2-yl, quinazolin-2-yl, cinnolin-3-yl, phenanthridin-6- and -3-yl, 8-N-butylamino-, 8-N-(2′-hydroxyethyl)amino-and 8-N-(2′-methoxyethyl)amino-quinolin-6-yl; 2,6-dihydroxypyridin-3-yl, 4-methylpyridin-2-yl, 2-hydroxy-3-cyanopyridin-5-yl, 4-chloropyridin-2-yl, 2,6-dihydroxy-3-cyano-4-methylpyridin-5-yl, 4-(4′-chlorophen-1′-yl)-pyridin-2-yl, 4-methyl-3-cyano-2-N-phenylamino-6-N′-(2′-methoxyeth-1′-yl)-aminopyridin-5-yl, 4-methyl-3-cyano-2,6-bis-[N-(3′-methoxyprop-1′- yl)-amino]-pyridin-1-yl and 4-methyl-3-cyano-2-N-butylamino-6-N'-(3'-methoxyprop-1'-yl)aminopyridin-6-yl. Of these 4-phenyl-2-N,N-dimethylamino-1,3-thiazol-5-yl, 4-phenyl-2-N,N-diethylamino-1,3-thiazol-5-yl, N-ethylcarbazol-2-yl, N-methyl-2-phenylindol-3-yl and 2,6-dihydroxy-3-cyano-4-methylpyridin-5-yl are particularly advantageous.

Other suitable radicals $R^2$ in the naphtholactam dyes of the general formula I which are to be used according to the invention are radicals of the general formula V.

In the general formula V, q is 0 or 1 and, independently thereof, r is 0, 1 or 2.

Examples of suitable radicals $R^9$ and $R^{11}$ in the general formula V are hydrogen or, where q is 1, $R^9$ and $R^{11}$ together are an unsubstituted or $C_1$–$C_4$-alkylsubstituted $C_2$- or $C_3$-alkylene chain, such as ethylene, propane-1,2-diyl, propane-1,3-diyl, butane-1,3-diyl, butane-2,3-diyl, 2,2-dimethylpropane-1,3-diyl or hexane-1,4-diyl, or together are one or two carbonyl groups.

The condition where q is 1 and $R^9$ and $R^{11}$ together are an unsubstituted or substituted $C_2$- or $C_3$-alkylene chain gives rise to radicals $R^2$ of the general formula V-a or V-b

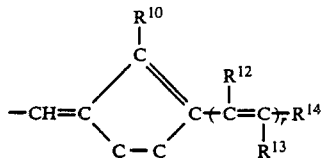

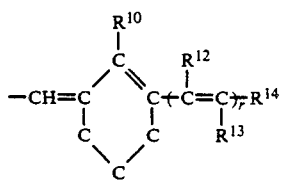

where the further indices and variables have the meanings described in detail above.

The condition where q is 1 and $R^9$ and $R^{11}$ together are a carbonyl group gives rise to a radical $R^2$ of the general formula V-c

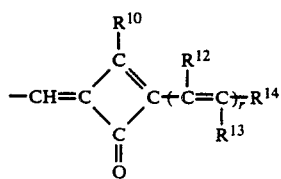

where the further indices and variables have the meanings described in detail above.

Furthermore, the condition where q is 1 and $R^9$ and $R^{11}$ are each a carbonyl group gives rise to a radical $R^2$ of the general formula V-d

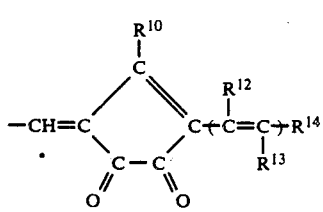

where the further indices and variables have the meanings described in detail above.

Examples of suitable radicals $R^{10}$, $R^{12}$ and $R^{13}$ in the general formulae V to V-d are hydrogen, halogen, oxygen, in particular having a single negative charge, cyano, nitro, hydroxyl, the radicals $R^1$ described above, methoxy, ethoxy, propoxy, butoxy, pentyloxy, hexyloxy, cyclopentyloxy, cyclohexyloxy, 4-methylcyclohexyloxy, phenoxy, 2-methylphen-1-yloxy, 4-methylphen-1-yloxy, naphth-1-yloxy, benzyloxy (=phenylmethoxy), 2-phenyleth-1-yloxyl, 3-phenylprop-1-yloxy, 4-phenylbut-1-yloxy, methoxycarbonyl, ethoxycarbonyl, prop-1-yloxycarbonyl, prop-2-yloxycarbonyl, but-1-yloxycarbonyl, but-2-yloxycarbonyl, pent-1-yloxycarbonyl, hex-1-yloxycarbonyl, cyclopentyloxycarbonyl, cyclohexyloxycarbonyl, benzyloxycarbonyl, 2-phenyleth-1-yloxycarbonyl, 3-phenylprop-1-yloxycarbonyl, 4-(naphth-2'-yl)-but-1-yloxycarbonyl, phenoxycarbonyl, naphth-1-yloxycarbonyl, naphth-2-yloxycarbonyl and the corresponding homologous aminocarbonyls, oxysulfonyls, sulfonyls or oxycarbonylaminyls and the radicals $R^2$ described above which are substituted or unsubstituted, monocyclic or fused heterocyclic radicals from the class consisting of the azoles, the azolines, the azines and the partially hydrogenated azines, which heterocyclic radicals are bonded to the olefinically unsaturated basic skeletons of the general formulae V to V-d via a ring carbon atom.

Examples of suitable radicals $R^{14}$ in the general formulae V to V-d are the radicals $R^2$ of the general formula III which are described above, the radicals $R^2$ of the general formula IV which are described above, the radicals $R^2$ which are described above and which are substituted and unsubstituted, monocyclic or fused heterocyclic radicals from the class consisting of the azoles, the azolines, the azines and the partially hydrogenated azines, which heterocyclic radicals are bonded to the olefinically unsaturated basic skeletons of the general formulae V to V-d via a ring carbon atom, and furthermore thiols, such as thiophen-2-yl (=thien-2-yl), 4-methylthien-2-yl, 4-methyl-5-phenylthien-2-yl, 5-N,N-dimethylamino-and 5-N,N-diethylaminothien-2-yl, benzo[b]thien-2-yl, 4-methylbenzo[b]thien-7-yl and naphtho[2,3-b]thien-2-yl and thianthren-2-yl, 2,3,7,8-tetramethylthianthren-1-yl and 3-chlorothianthren-7-yl.

Examples of other suitable radicals $R^{14}$ in the general formulae V to V-d are the radicals of the general formula VI.

In the general formula VI, $R^1$ has the abovementioned meanings of the radicals $R^1$ in the general formula I.

The index s in the general formula VI is 0, 1, 2 or 3. Independently thereof, the index t in the general formula VI is likewise, 0, 1, 2 or 3. The indices s and t in the general formula I have the same meanings as in the general formula VI.

Examples of suitable radicals $R^3$ and $R^4$ in the general formula VI are the radicals $R^{10}$, $R^{12}$ or $R^{13}$ of the general formulae V to V-d which are described above, the radicals $R^1$ of the general formula I which are described above, carboxylic acid groups, sulfo groups and phosphonic acid groups, methylthio, ethylthio, prop-1-ylthio, prop-2-ylthio, but-1-ylthio, but-2-ylthio, tert-butylthio, pent-1-ylthio, isopent-1-ylthio, hex-1-ylthio, hex-2-ylthio, cyclopentylthio, cyclohexylthio, benzylthio, 4-methylbenzene-1-thio, 2-methylbenzene-1-thio, 3-chlorobenzene-1-thio, 4-chlorobenzene-1-thio, 2-ethylbenzene-1-thio, naphth-1-ylthio, naphth-2-ylthio, phenylmethylthio, 2-phenyleth-1-ylthio, 2-(4'-cyanophen-1'-yl)-eth-1-ylthio, 3-phenylprop-1-ylthio, 6-phenylhex-1-ylthio and the corresponding oxysulfonyls, sulfonyls and oxycarbonylaminyls, and N,N-dimethyl-, N,N-diethyl-, N,N-di-n-propyl-, N,N-diisopropyl-, N,N-di-n-butyl-, N-n-butyl-N-tert-butyl-, N,N-dipentyl-, N,N-dihexyl-, N,N-diphenyl-, N-methyl-N-phenyl-, N-ethyl-N-phenyl-, N,N-dibenzyl-, N,N-di-(2-phenyleth-1-yl)-, N-ethyl-N-benzyl-, N-phenyl-N-benzyl-, N-(4'-methylphenyl)- N-[2-(4'-cyanophen-1'-yl)-eth-1-yl]-, N,N-dicyclopentyl-, N,N-dicyclohexyl-, N-cyclopentyl-N-cyclohexyl-, N-methyl-N-cyclohexyl-, N-ethyl-N-cyclohexyl-, N-phenyl-N-cyclohexyl-, N-benzyl-N-cyclohexyl-and N-(2-phenyleth-1-yl)-N-cyclohexylamino, -aminosulfonyl and -aminocarbonyl. The radicals $R^3$ and $R^4$ may be identical or different.

Further examples of suitable radicals $R^3$ and $R^4$ are carbon, nitrogen, oxygen and/or sulfur, which form part of the skeleton of one or more rings fused to the naphth-1,8-ylene group of the general formula VI, the substitution patterns VI-1 to VI-15 being particularly suitable here:

VI-1, t = 2,

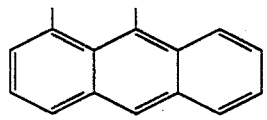

VI-2, t = 2

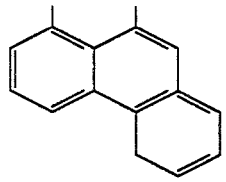

VI-3, s and t = 2,

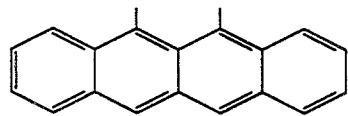

VI-4, s = 1, t = 2,

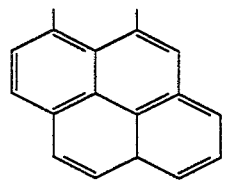

VI-5, s and t = 1,

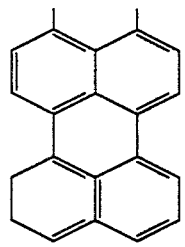

VI-6, s and t = 1,

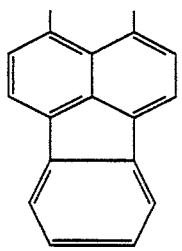

VI-7, t = 2,

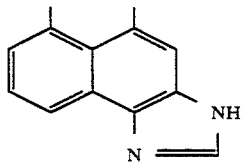

VI-8, t = 2,

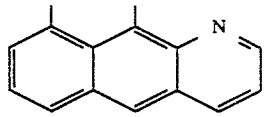

VI-9, t = 2,

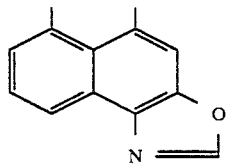

VI-10, t = 2,

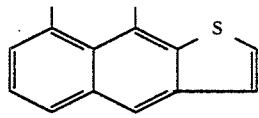

VI-11, s and t = 1,

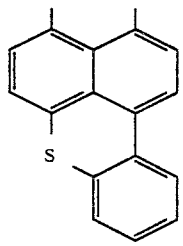

VI-12, t = 2,

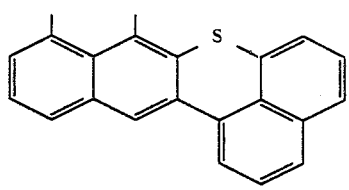

VI-13, s = 1, t = 2,

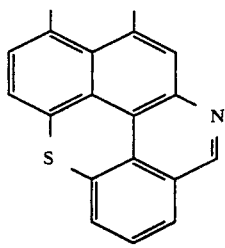

VI-14, s = 3, t = 2,

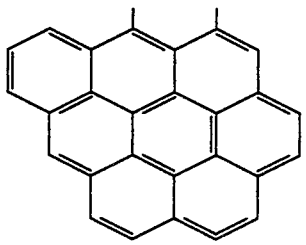

or VI-15, t = 2,

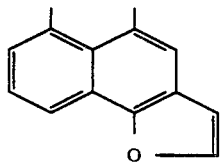

the substitution pattern VI-11 being particularly preferred.

In the general formula I, $R^3$ and $R^4$ and s and t have the same meanings as in formula VI.

Other suitable radicals $R^2$ in the naphtholactam dyes of the general formula I which are to be used according to the invention are radicals of the general formula VII, where $R^1$, $R^3$, $R^4$, s and t have the same meanings as those stated for formula VI and $R^{15}$ is the radical of a CH-acidic compound.

CH-acidic compounds are compounds which have loosely bound methylene or methine protons α to one or two aldehyde, keto, ester, nitrile or nitro groups. It is known that such compounds can undergo the conventional aldol condensation, aldol addition, Perkin reaction, Knoevenagel condensation or Mannich reaction.

Examples of suitable radicals $R^{15}$ are barbituric acid radicals (=1,3-diazine-2,3,6-trion-5-yl) of the general formula VIII

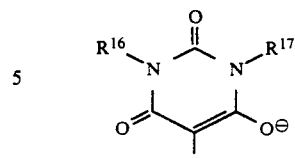

where $R^{16}$ and $R^{17}$ are identical or different, $C_1$-$C_{22}$-alkyl, $C_5$-$C_7$-cycloalkyl, $C_6$-$C_{10}$-aryl, ω-aryl-$C_1$- to ω-aryl-$C_6$-alkyl, oxaalkanyl, azaalkanyl or thiaalkanyl.

Examples of suitable radicals $R^{16}$ and $R^{17}$ are the alkyl, cycloalkyl, aryl or ω-arylalkyl radicals $R^1$ described above in the general formula I, the alkoxy-substituted alkyl radicals $R^1$ in the general formula I, the alkyl radicals $R^1$ in the general formula I which are substituted by alkylthio radicals $R^1$, or the alkylamino-substituted alkyl radicals $R^1$ in the general formula I, of which methyl, ethyl, butyl and 6-ethyl-4-oxadec-1-yl are particularly preferred.

If radicals $R^2$ of the general formulae V to V-d, where $R^{14}$ is a radical of the general formula VI, or radicals $R^2$ of the general formula VII are used in the naphtholactam dyes of the general formula I, it is very particularly advantageous if the variables $R^1$, $R^3$ and $R^4$ and the indices s and t of the general formulae VI and VII are identical to the relevant variables and indices of the general formula I.

Examples of suitable anions T in naphtholactam dyes of the general formula I are chloride, bromide, iodide, nitrate, sulfate, perchlorate, bromate, tetrafluoborate, hexafluorophosphate, hexafluorosilicate, methanesulfonate, benzenesulfonate, ethylsulfate, phosphate, salicylate, oxalate, acetate, trifluoromethane-sulfonate, tetrachlorozincate, tetrachloroaluminate, hexachloroferrate, hexafluoroarsenate, hexafluoroantimonate, hexachloroantimonate and the nickel dithiolate anions disclosed in EP-A-0 224 261.

The naphtholactam dyes of the general formula I which are to be used according to the invention or, in brief, the naphtholactam dyes I do not contain an anion T if the single positive charge of the naphtholactam nitrogen in the formula I is neutralized by a single negative charge in the naphtholactam dye I, this being referred to very generally as a betaine structure and corresponding to the condition n=0.

If the naphtholactam dye I also contains further single negative charges, for example several sulfo groups, these are of course associated with conventional cations. Here too, the condition n=0 is applicable.

Otherwise, n is ⅓, ½, ⅔, 1, 2 or 3, depending on the number of positive charges in the naphtholactam dye I on the one hand and on the number of negative charges in anion T on the other hand.

Examples of naphtholactam dyes I which are very particularly advantageously used according to the invention are the naphtholactam dyes I-1 to I-120:

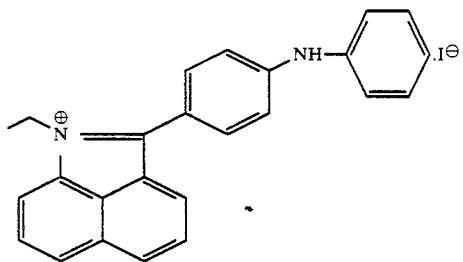
I-1
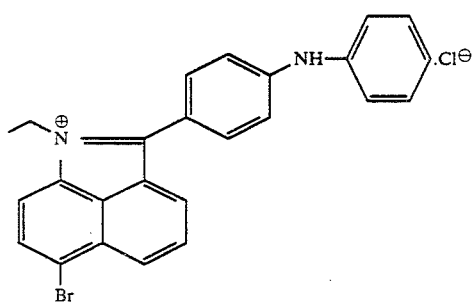
I-2
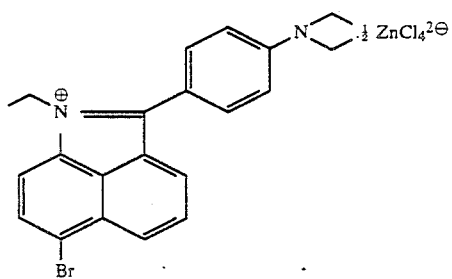
I-3
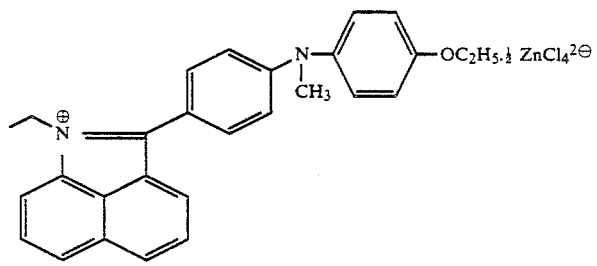
I-4
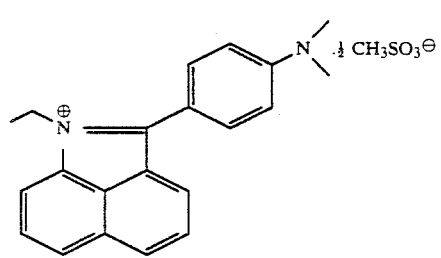
I-5

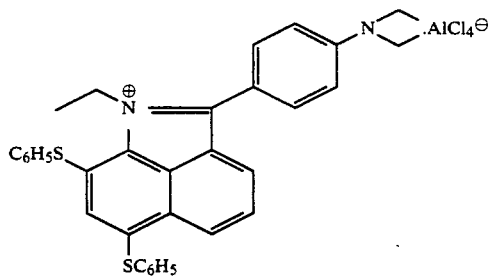
I-6
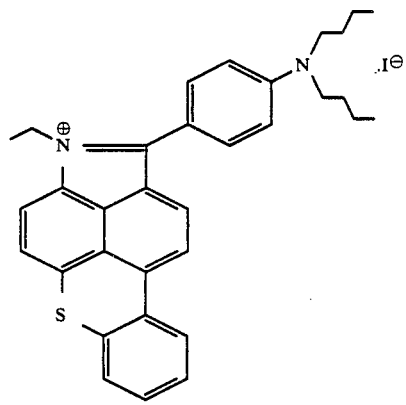
I-7
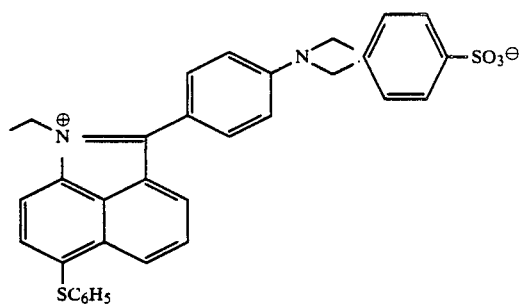
I-8
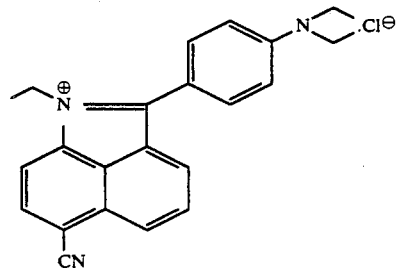
I-9
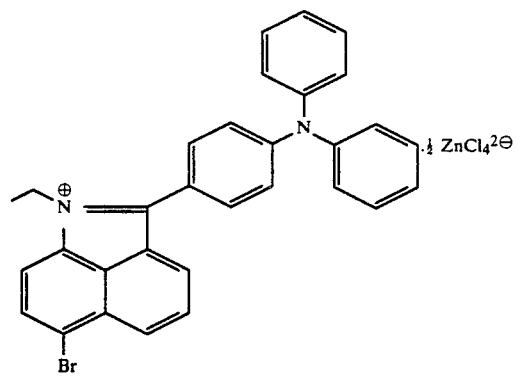
I-10

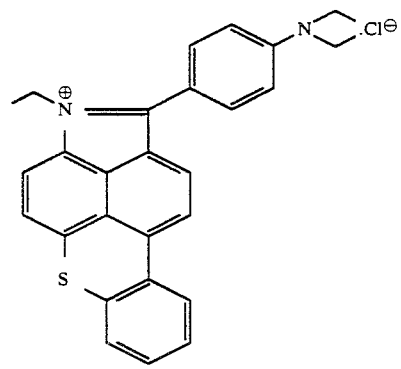
I-11
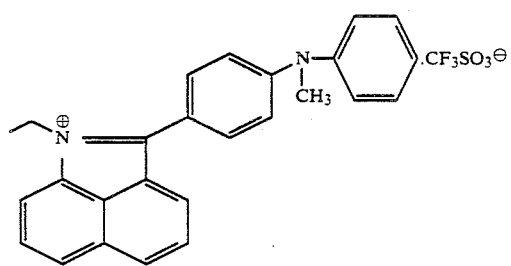
I-12
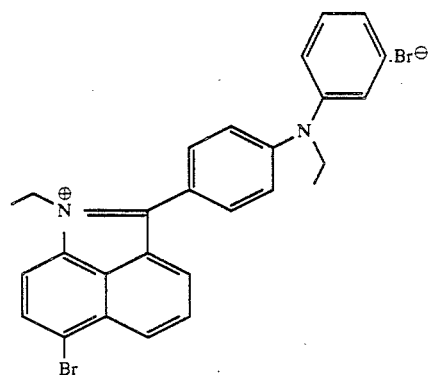
I-13
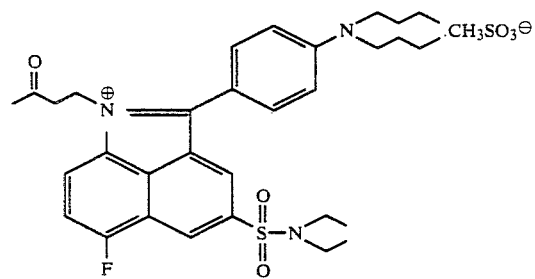
I-14

-continued
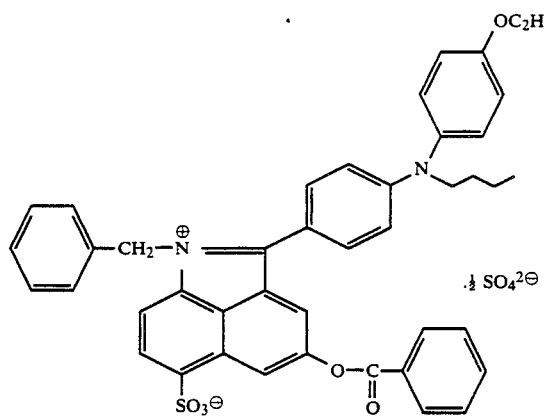
I-15
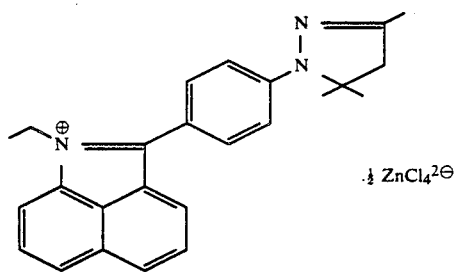
I-16
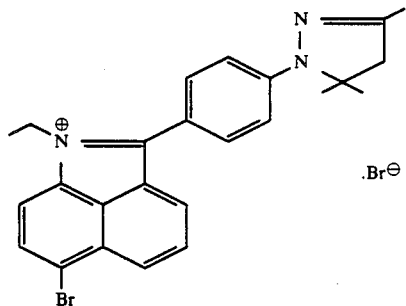
I-17
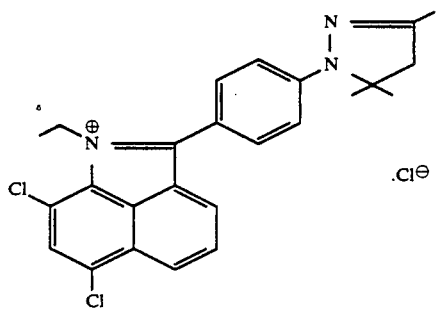
I-18
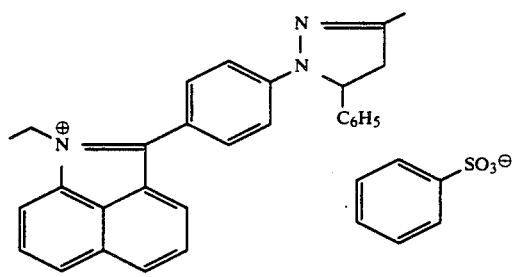
I-19

-continued
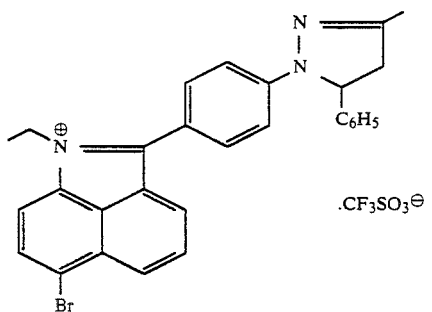
I-20
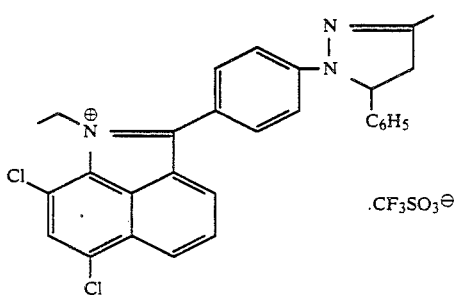
I-21
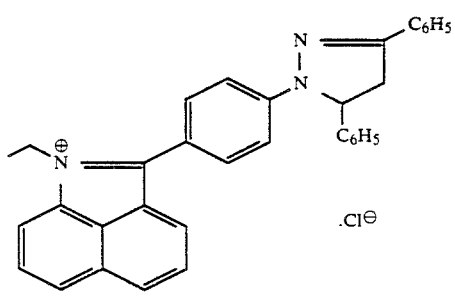
I-22
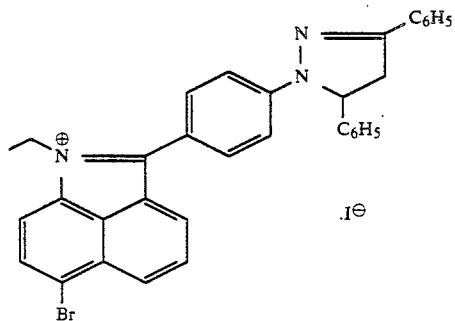
I-23
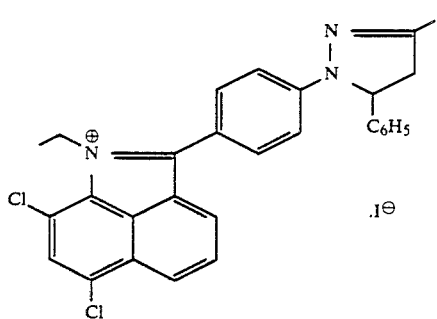
I-24

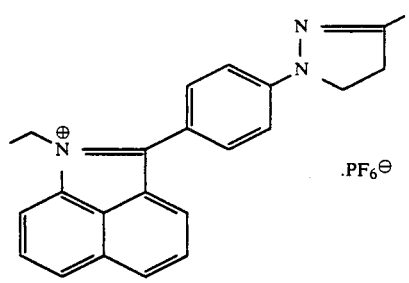
I-25
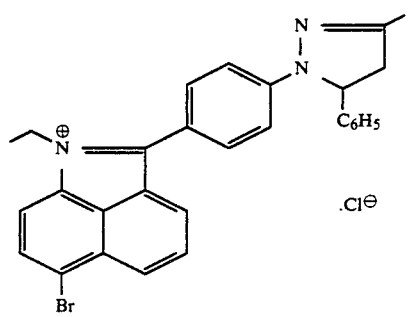
I-26
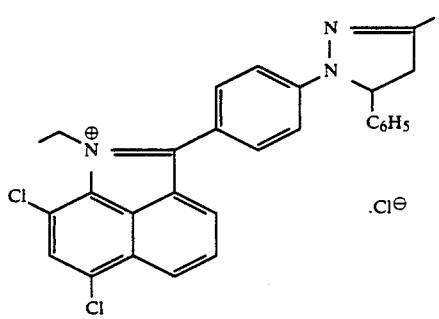
I-27
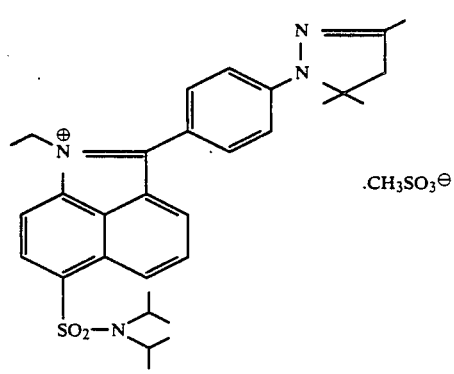
I-28
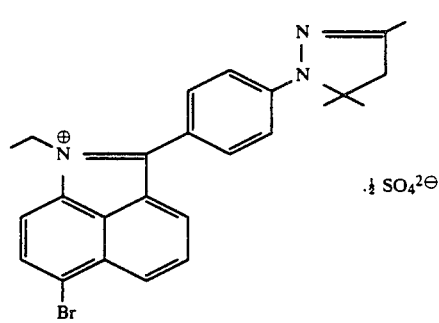
I-29

-continued
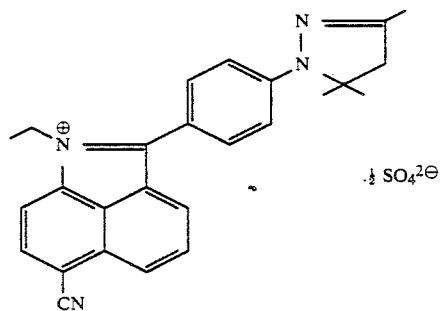
I-30
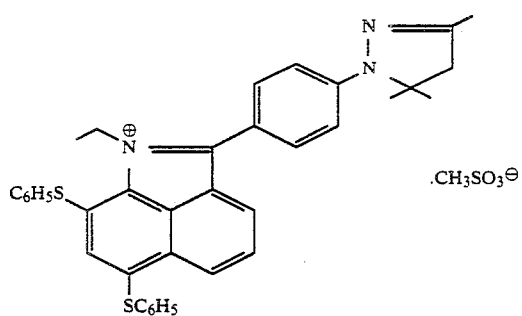
I-31
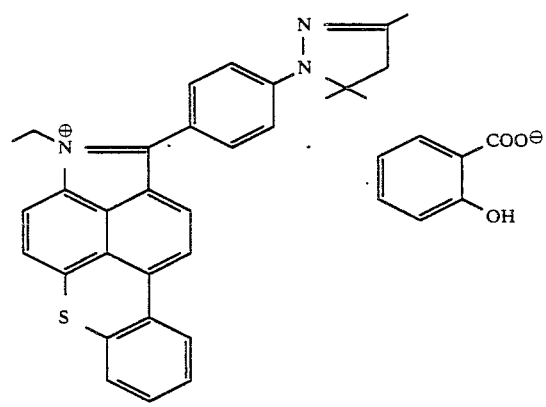
I-32
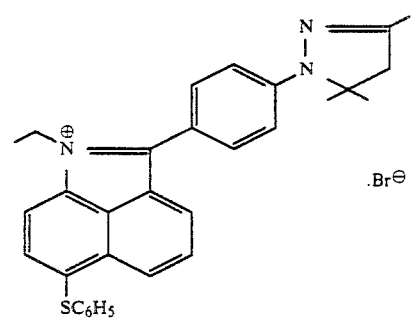
I-33

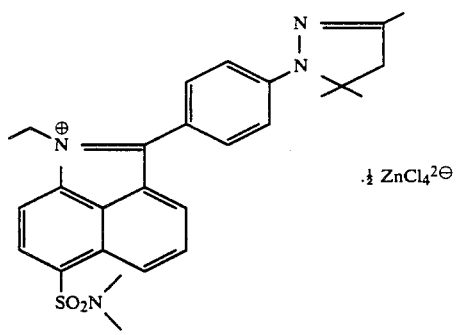
I-34
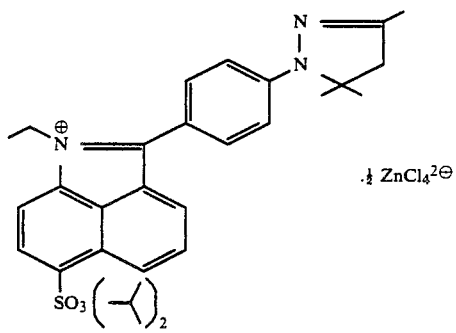
I-35
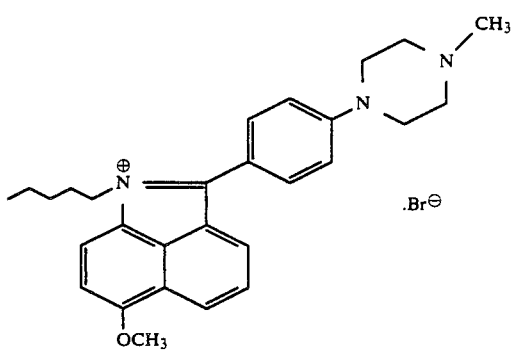
I-36
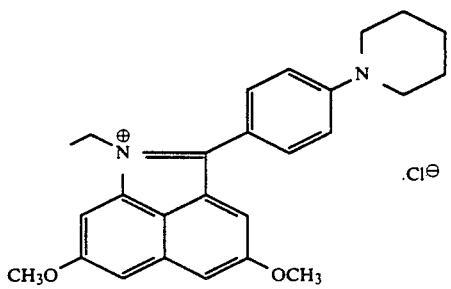
I-37
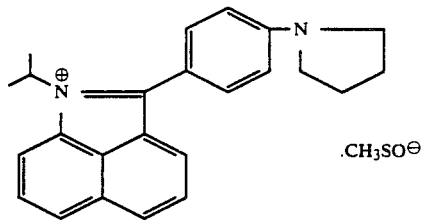
I-38

I-39
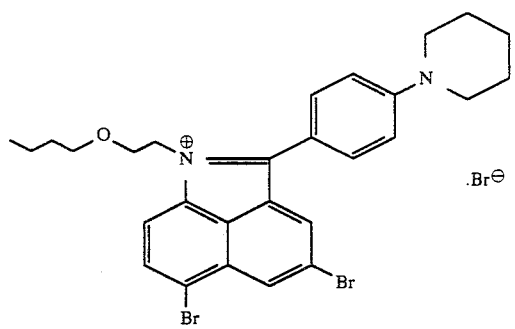
I-40
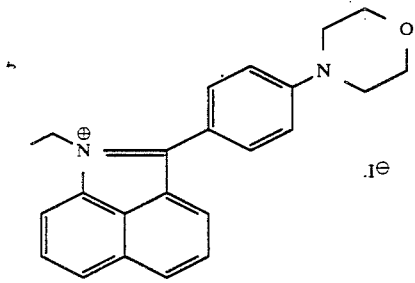
I-41
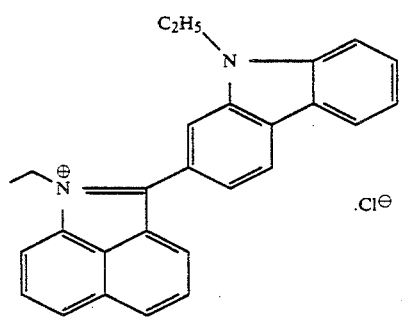
I-42
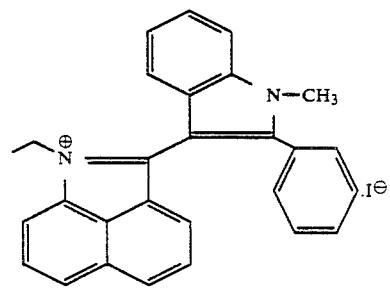
I-43
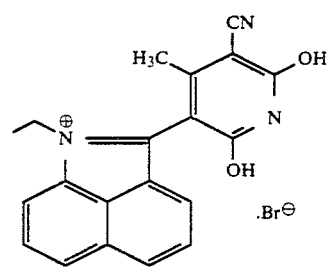

-continued
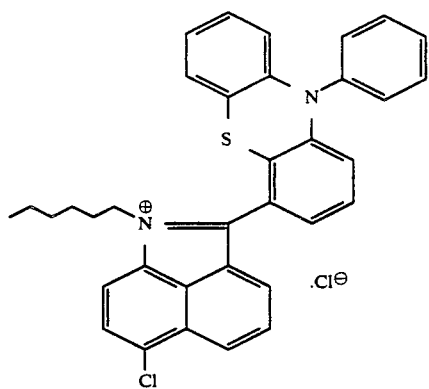
I-44
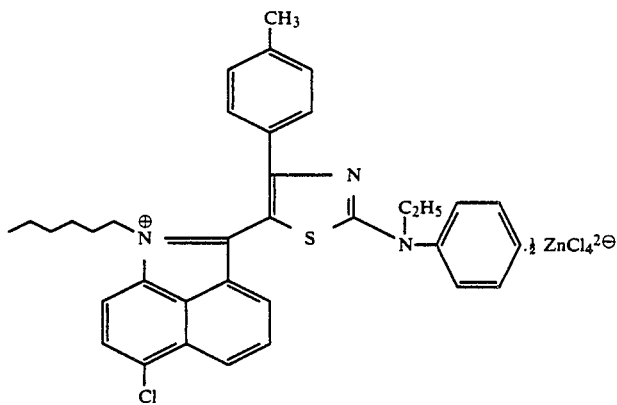
I-45
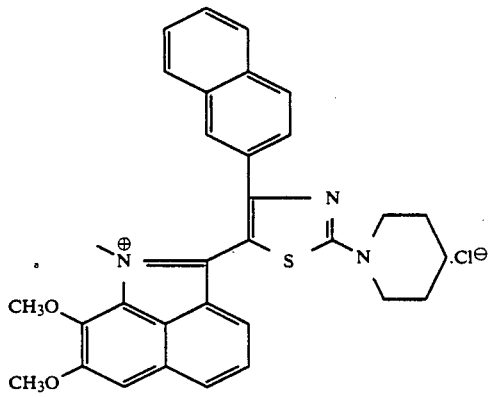
I-46
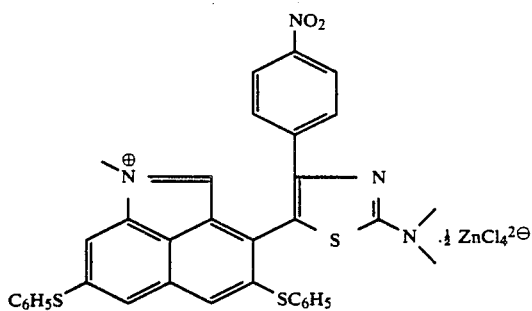
I-47

-continued
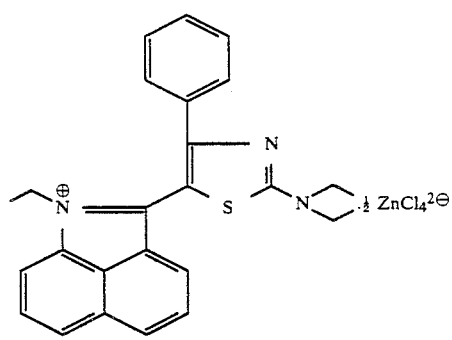 I-48
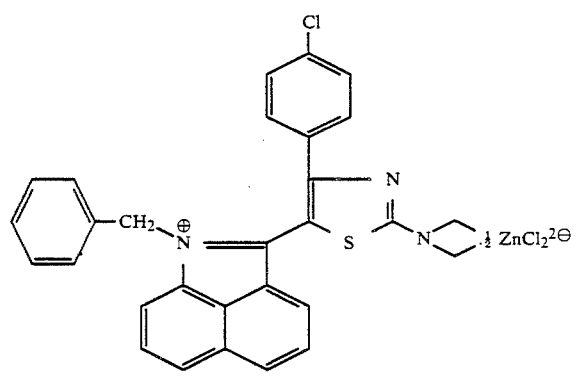 I-49
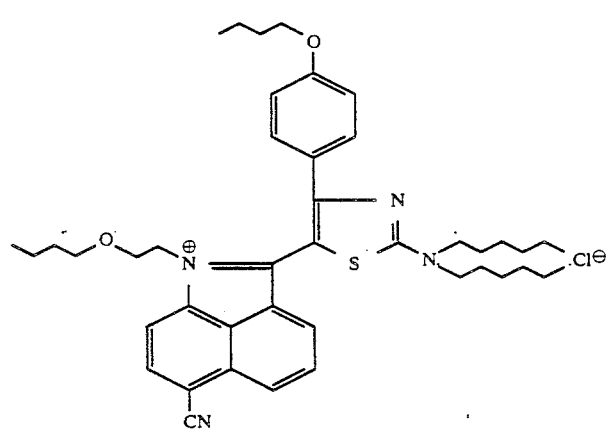 I-50
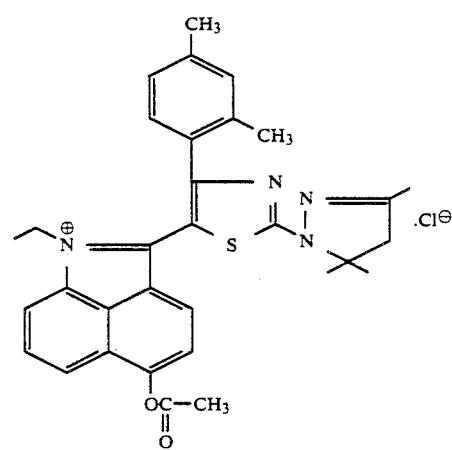 I-51

-continued
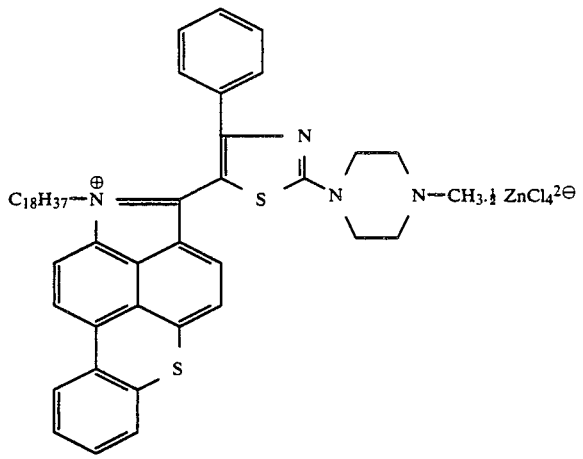
I-52
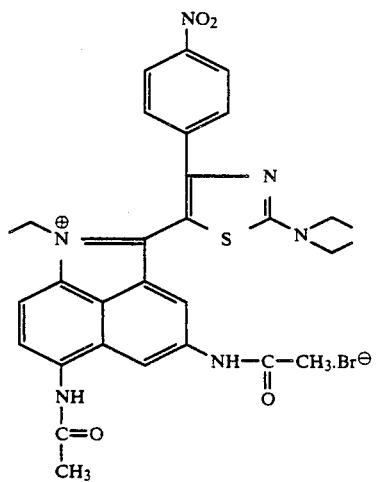
I-53
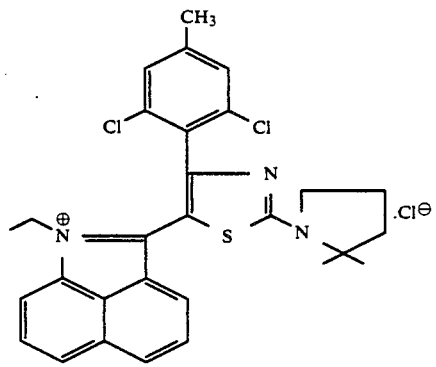
I-54
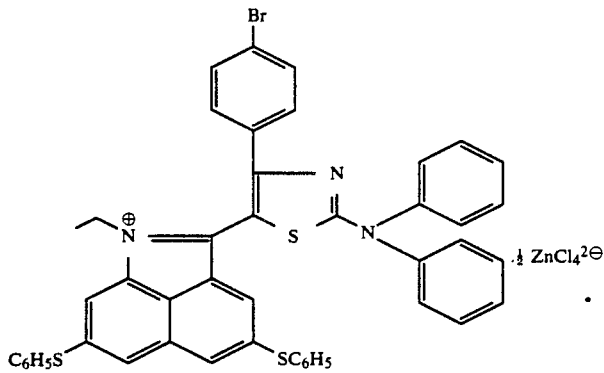
I-55

-continued
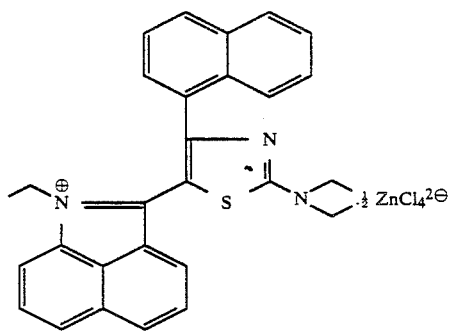
I-56
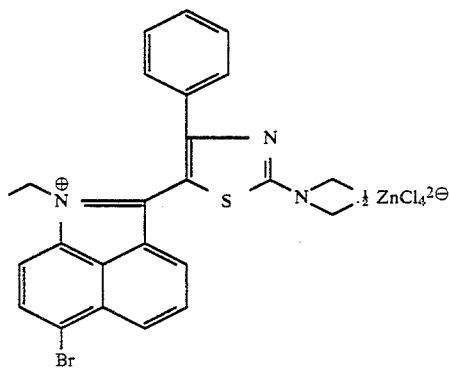
I-57
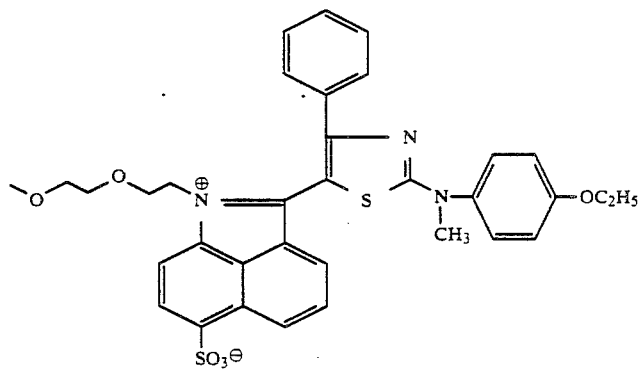
I-58
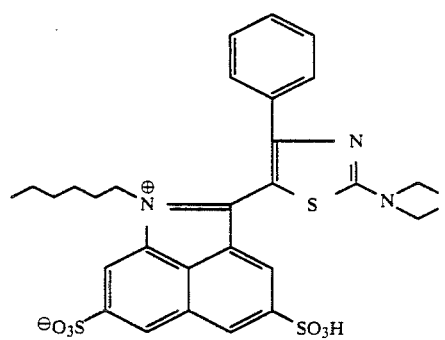
I-59

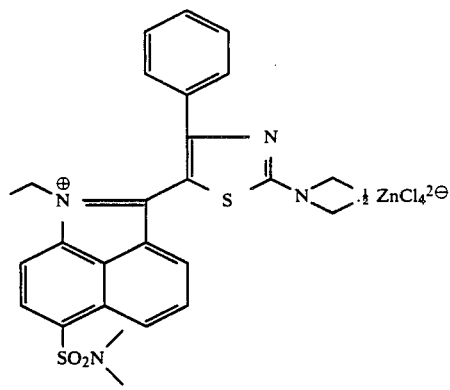
I-60
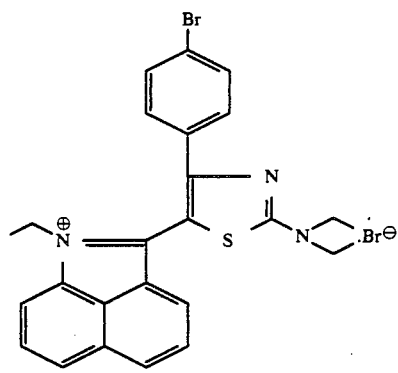
I-61
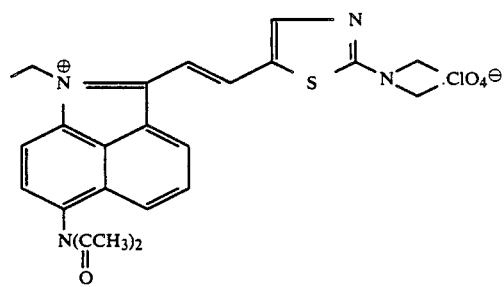
I-62
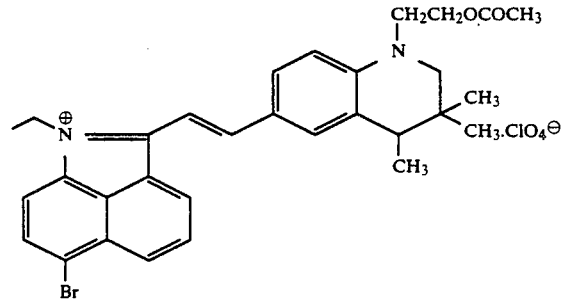
I-63
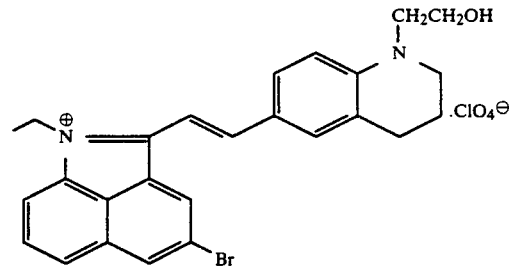
I-64

-continued
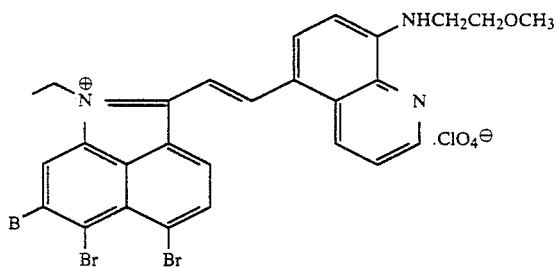 I-65
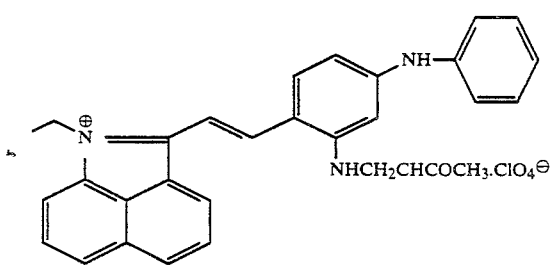 I-66
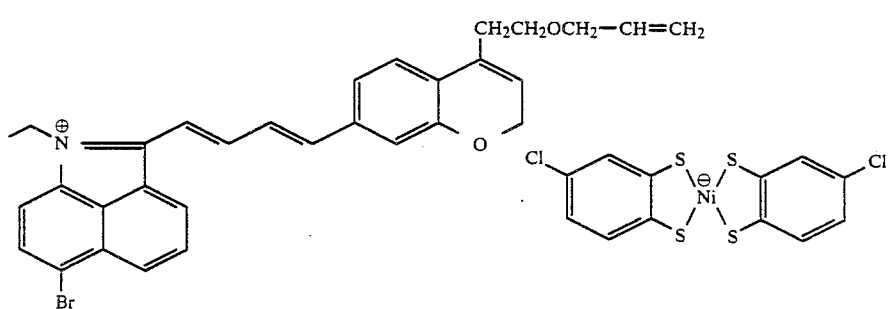 I-67
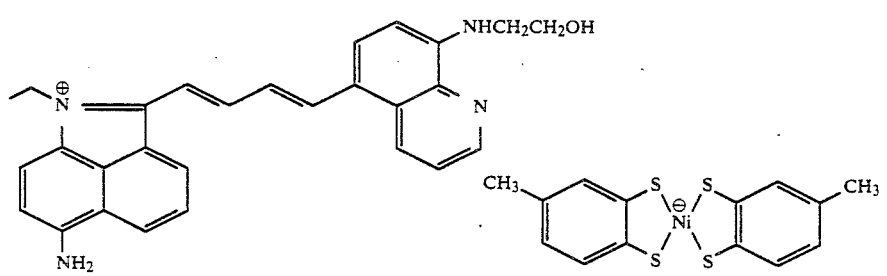 I-68
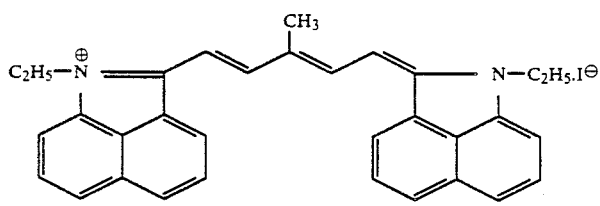 I-69
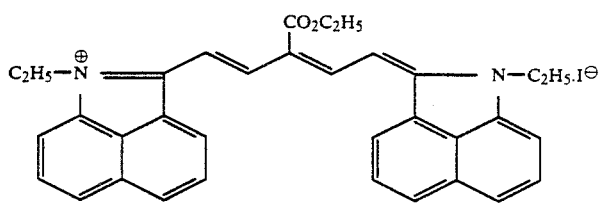 I-70

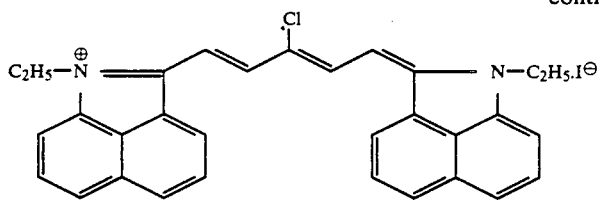
I-71
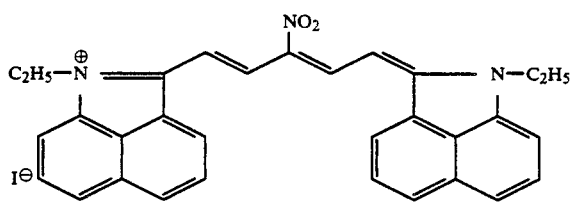
I-72
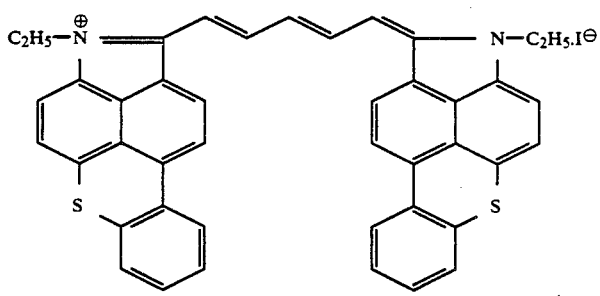
I-73
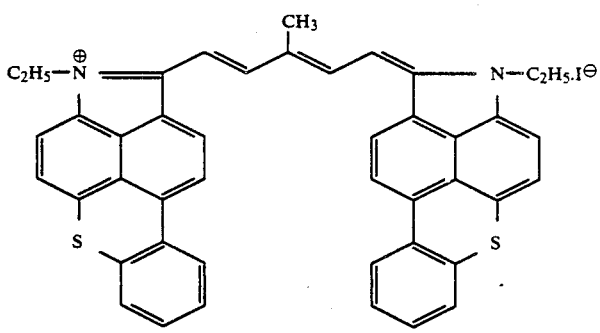
I-74
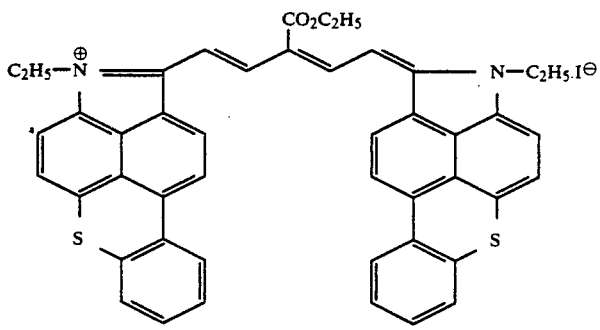
I-75
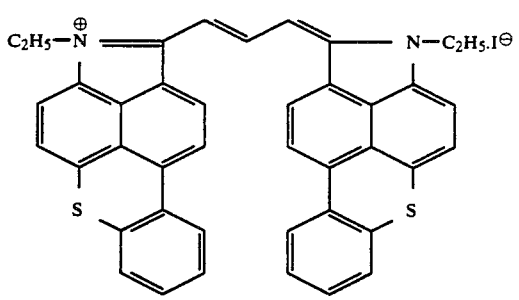
I-76

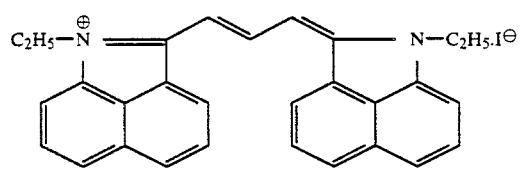
I-77
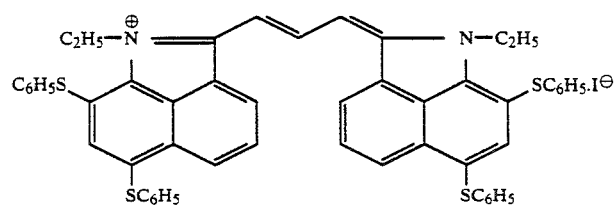
I-78
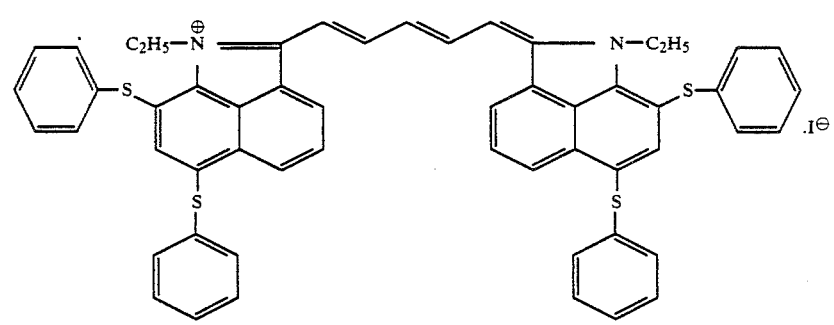
I-79
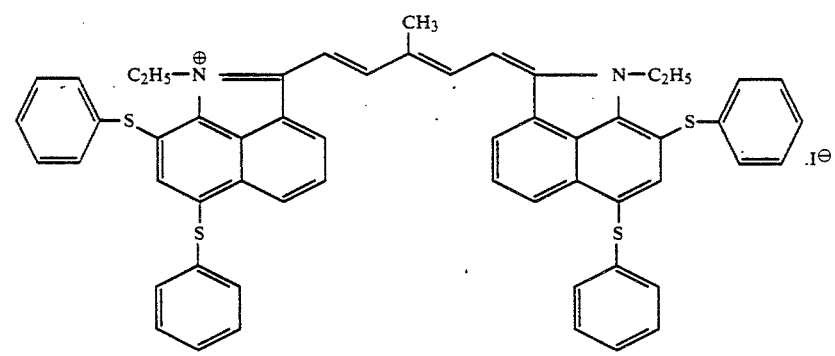
I-80
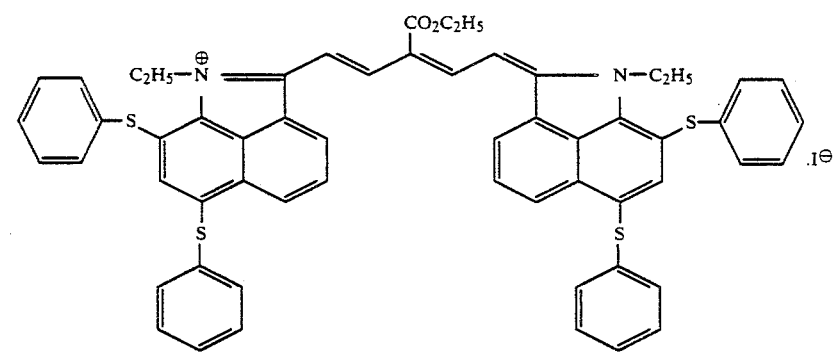
I-81

-continued
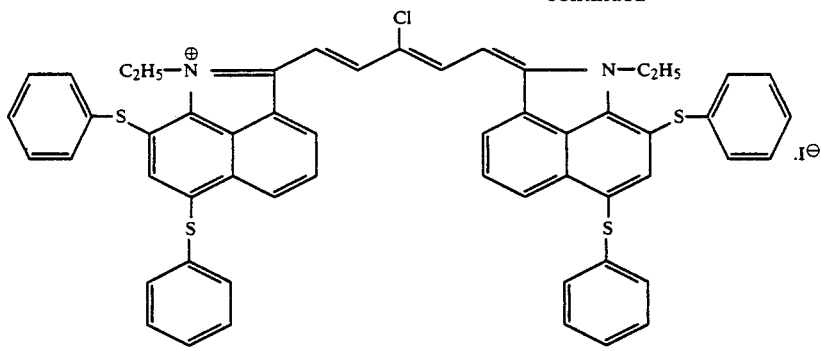
I-82
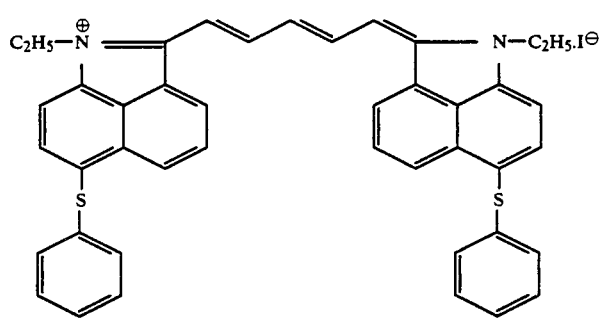
I-83
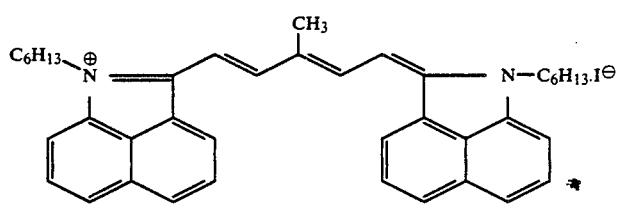
I-84
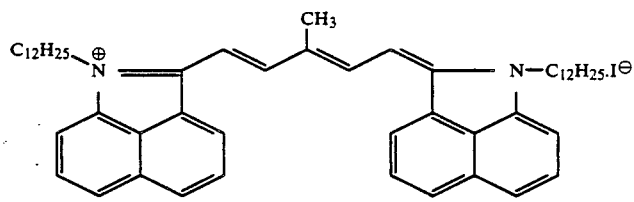
I-85
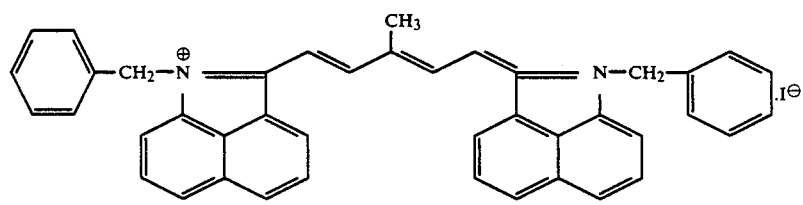
I-86
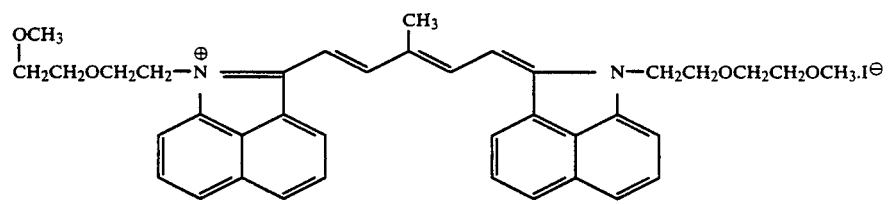
I-87

-continued
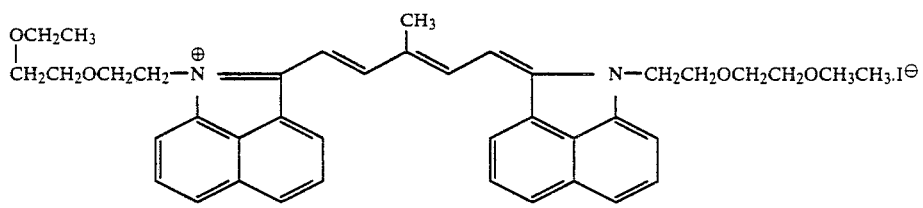
I-88
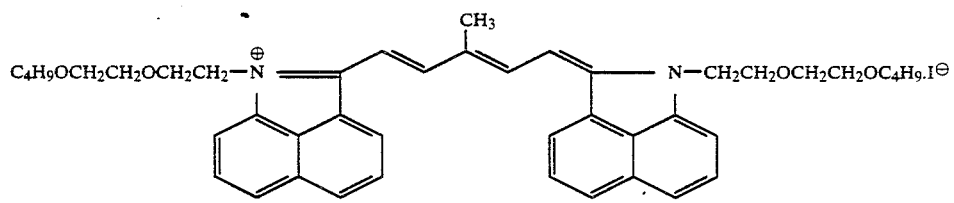
I-89
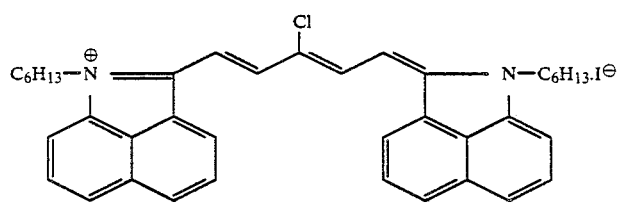
I-90
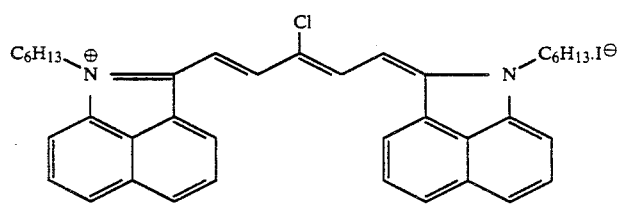
I-91
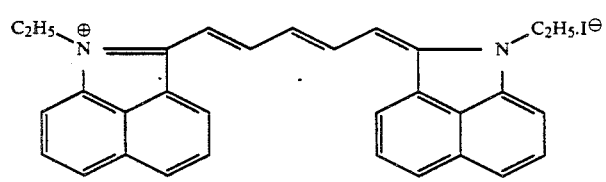
I-92
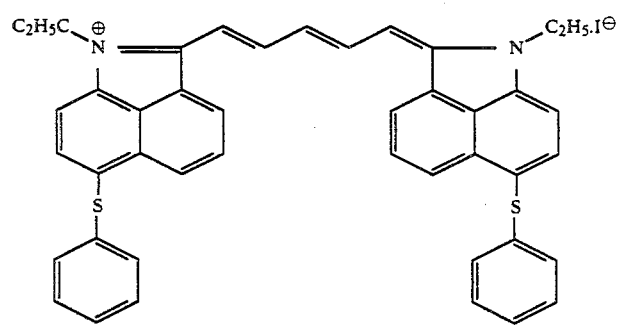
I-93
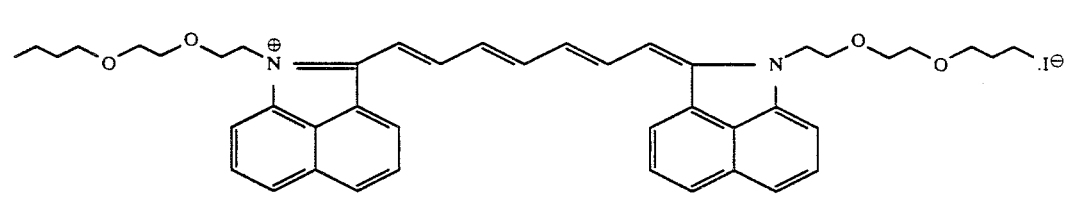
I-94

-continued
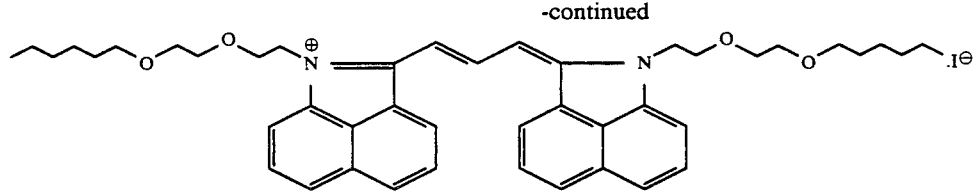 I-95
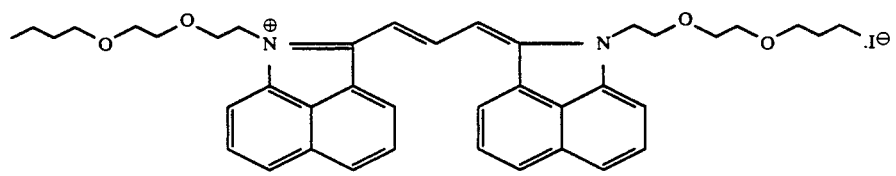 I-96
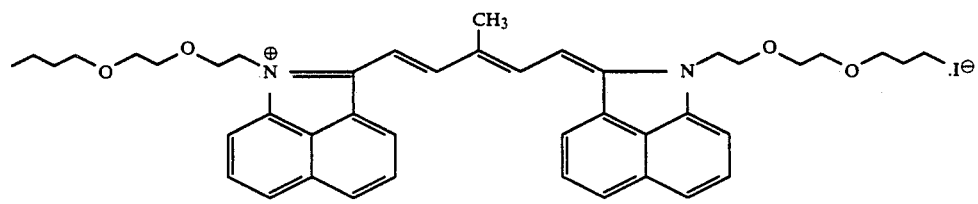 I-97
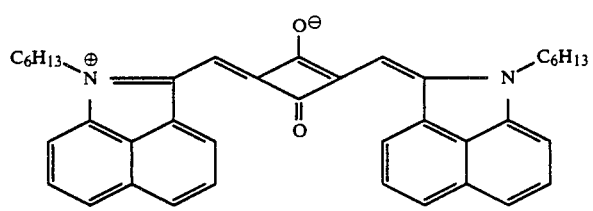 I-98
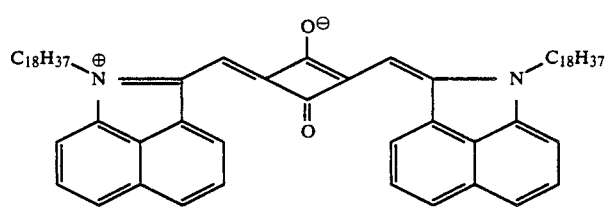 I-99
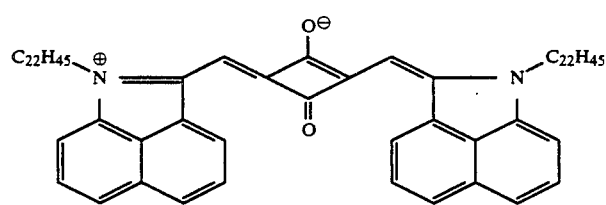 I-100
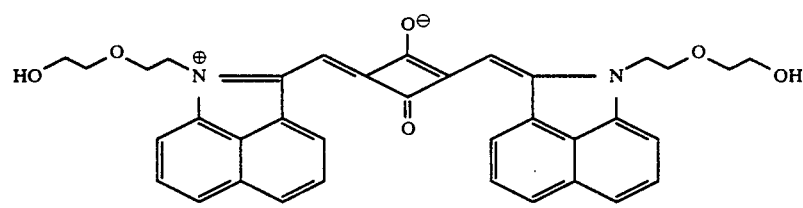 I-101
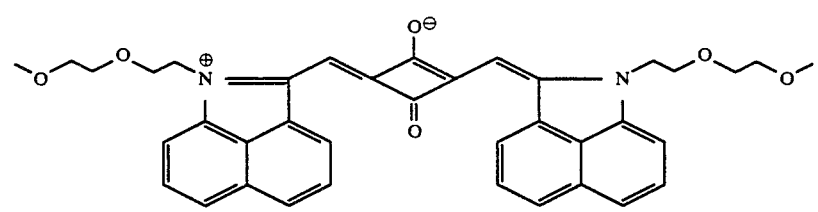 I-102

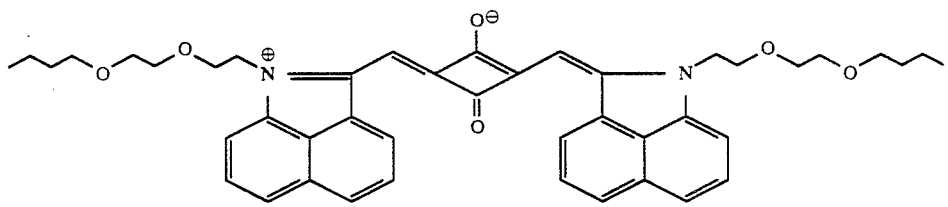
I-103
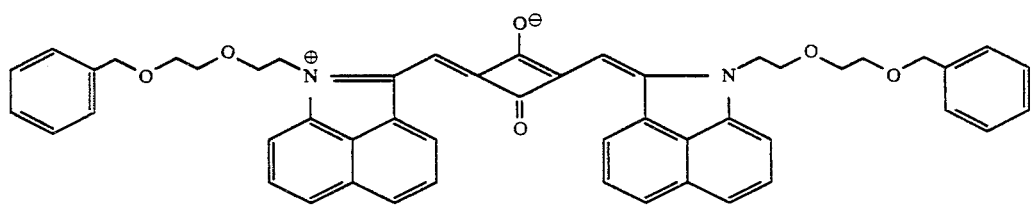
I-104
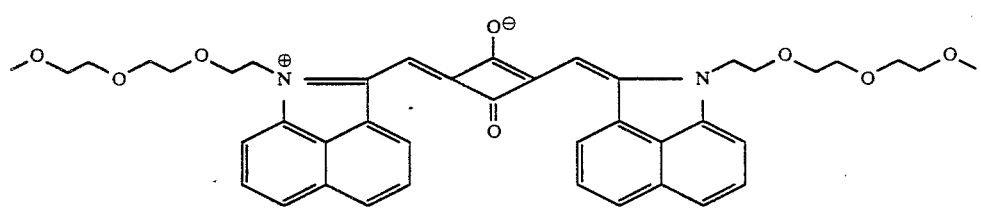
I-105
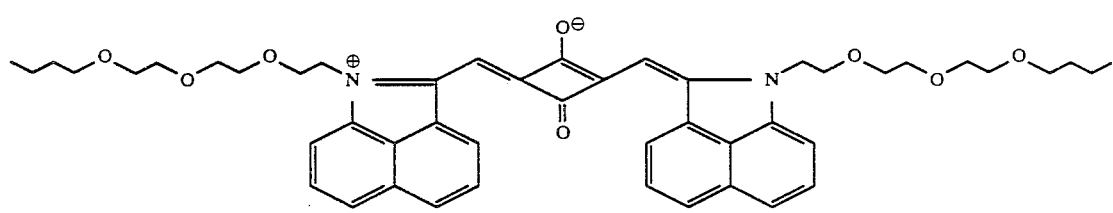
I-106
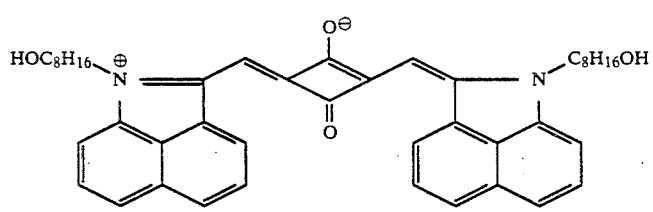
I-107
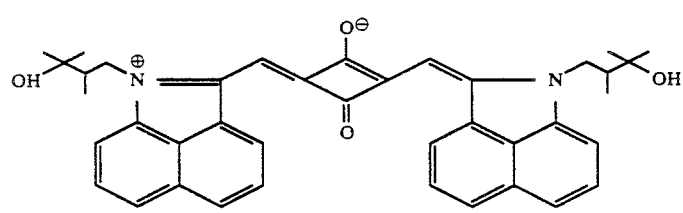
I-108
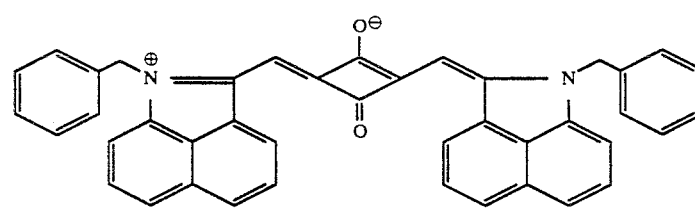
I-109
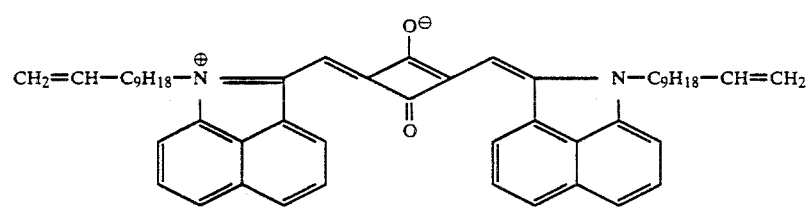
I-110

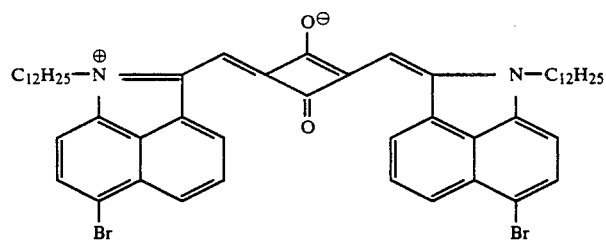
I-111
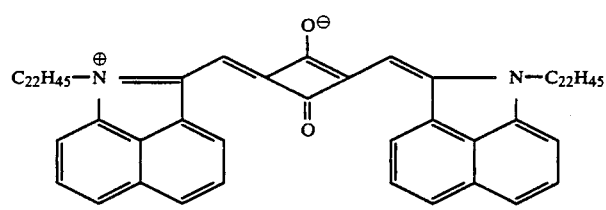
I-112
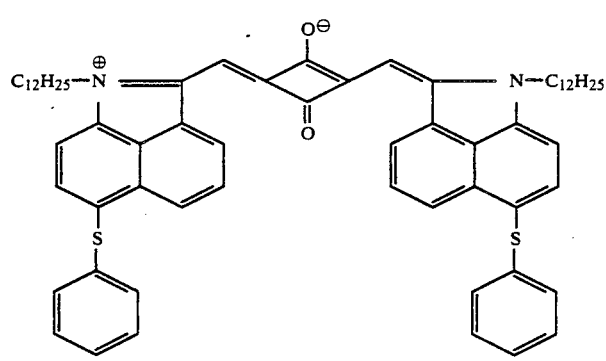
I-113
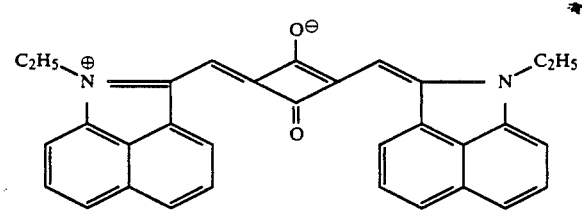
I-114
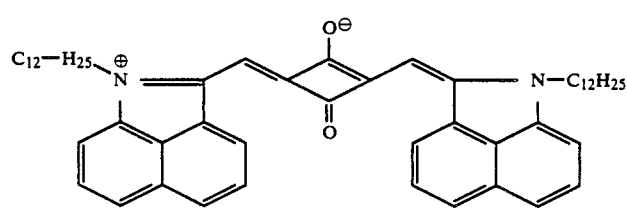
I-115
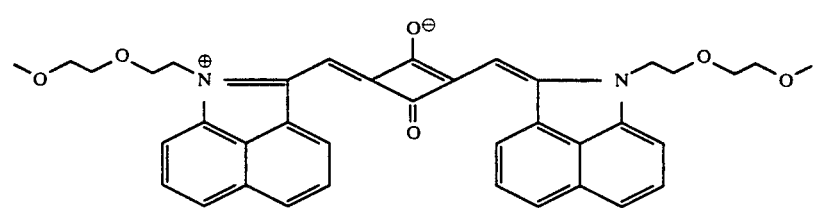
I-116
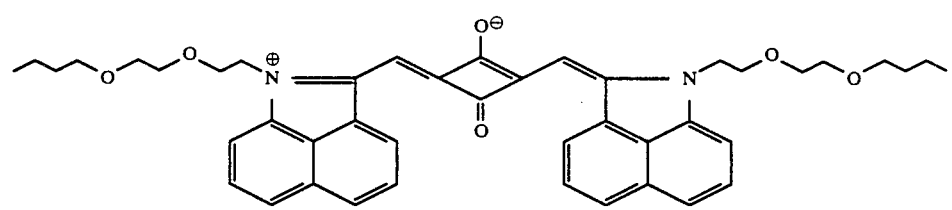
I-117

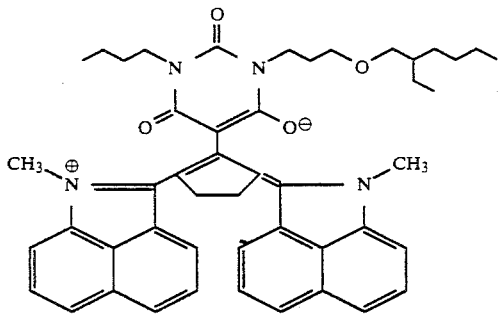

I-118

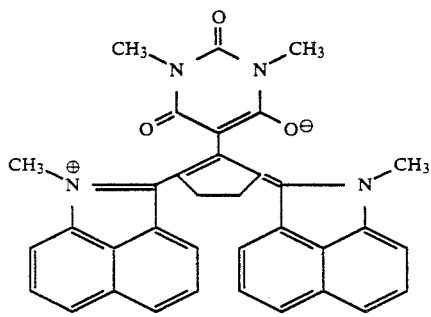

I-119

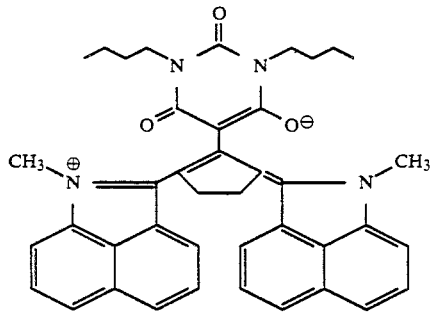

I-120

Examples of naphtholactam dyes I which are very particularly advantageously used according to the invention and which then have an excellent technical effect are the naphtholactam dyes I-2, I-3, I-10, I-13, I-16, I-34, I-35, I-48, I-57, I-60, I-71, I-77, I-85, I-96, I-97, I-98, I-99, I-102, I-103, I-107 and I-115, of which I-71, I-77, I-85, I-96 and I-97 are noteworthy.

Examples of naphtholactam dyes I to be used according to the invention and having the structure illustrated by way of example by the naphtholactam dyes I-1 to I-15, and their preparation, are disclosed in DE-A-20 10 579, DE-A-11 65 790, DE-A-15 69 660 and DE-A-23 28 163.

Examples of naphtholactam dyes I to be used according to the invention and having the structure illustrated by way of example by naphtholactam dyes I-16 to I-40, and their preparation, are disclosed in JP-B-72-24244 and DE-A-23 28 163.

Examples of naphtholactam dyes I to be used according to the invention and having the structure illustrated by way of example by naphtholactam dyes I-41 to I-44, and their method of preparation, are likewise known from the prior art.

Naphtholactam dyes I to be used according to the invention and having the structure illustrated by way of example by the naphtholactam dyes I-45 to I-60 are prepared by condensation of a naphtholactam of the general formula IX

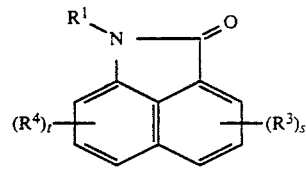

IX where the indices and the variables have the meanings explained above, with a suitable 1,3-thiazole derivative in the presence of POCl$_3$ and ZnCl$_2$. Suitable 1,3-thiazole derivatives are all those from which the above-mentioned 1,3-thiazolyl radicals are derived, in particular 4-aryl-2-N,N-dialkylamino-, -2-N,N-dicycloalkylamino-, -2-N-alkyl-N-cycloalkylamino-, -2-N,N-diarylamino-, -2-N-alkyl-N-arylamino-, -2-N-cycloalkyl-N-arylamino-, -2-N,N-di-(ω-arylalkyl)-amino-, -2-N-alkyl-N-(ω-arylalkyl)-amino-, -2-N-(ω-aralkyl)-N-arylamino-, -2-N-(ω-arylalkyl)-N-cycloalkylamino-, -2-(azolidin-1-yl)-, -2-(azol-1'-yl)-and 4-aryl-2-(perhydroazin-1'-yl)-1,3-thiazoles, of which 4-phenyl-2-N,N-diethylamino-1,3-thiazole is very particularly preferred.

The condensation is carried out in solution. Anhydrous inert organic solvents, for example 1,2-dichloroethane, are used for this purpose. Advantageously, a liquid mixture of POCl₃, anhydrous zinc chloride and a naphtholactam IX is first prepared and the solution of a suitable 1,3-thiazole in 1,2-dichloroethane is metered into this mixture at from 50° to 100° C., in particular from 60° to 90° C. Thereafter, the resulting reaction mixture is refluxed for a certain time, advantageously from 1 to 10 hours, while stirring. The hot or the cold reaction mixture is then poured into hot or cold water, the 1,2-dichloroethane is distilled off, and the highly concentrated solution of a salt is added to the resulting aqueous phase, with the result that the relevant naphtholactam dye I is precipitated as a crystalline solid. Thereafter, the relevant naphtholactam dye I to be used according to the invention is separated off, if necessary purified and then dried, the known separation, purification and drying methods conventionally used in preparative organic chemistry being employed. However, the condensation can also be carried out in the absence of a solvent.

Examples of naphtholactam dyes I to be used according to the invention and having the structure illustrated by way of example by the naphtholactam dye I-62, and their preparation, are disclosed in CA-A-1 023 188. This publication also describes their use in emulsions containing silver halide. These emulsions are used for the production of direct positive photographic films.

Examples of naphtholactam dyes I to be used according to the invention and having the structure illustrated by way of example by way of the naphtholactam dyes I-63 to I-68, and their preparation, are disclosed in EP-A-0 224 261. Their use for the production of recording layers of laser-optical computer disks is also described there.

Examples of naphtholactam dyes I to be used according to the invention and having the structure illustrated by way of example by the naphtholactam dyes I-69 to I-97, their preparation and their use for the production of recording layers of laser-optical computer disks are described in DE-A-36 08 214.

Examples of naphtholactam dyes I to be used according to the invention and having the structure illustrated by way of example by the naphtholactam dyes I-98 to I-117, their preparation and their use for the production of recording layers of laser-optical computer disks are described in DE-A-36 31 843.

Examples of naphtholactam dyes I to be used according to the invention and having the structure illustrated by way of example by the naphtholactam dyes I-118 to I-120, their preparation and their use for the production of recording layers of laser-optical computer disks are described in German Patent Application P 3738911.4.

Advantageous dyes are the isoindolenine dyes of the general formula X where

E is cyano, carbo-$C_1$-$C_4$-alkoxy, carbamyl, N-$C_1$-$C_4$-alkylcarbamyl where the alkyl radical is unsubstituted or substituted by $C_1$-$C_4$-alkoxy, N-phenylcarbamyl where the phenyl radical is unsubstituted or substituted by $C_1$-$C_4$-alkyl or $C_1$-$C_4$-alkoxy, or acetyl, benzoyl, 4-nitrophenyl or 4-cyanophenyl;

D is hydrogen, chlorine, $C_1$-$C_4$-alkyl or $C_1$-$C_4$-alkoxy, and, where d is 2, the substituents may be identical or different;

d is 1 or 2;

$R^{18}$ is hydrogen, methyl, ethyl or 2-hydroxyethyl and $R^{19}$ is phenyl which is unsubstituted or substituted by $C_1$-$C_4$-alkyl or $C_1$-$C_4$-alkoxy, or is cyclohexyl; or $R^{18}$ is hydrogen and $R^{19}$ is $C_1$-$C_4$-alkyl; or $R^{18}$ and $R^{19}$ are $C_1$-$C_6$-alkyl; $C_1$-$C_4$-alkyl which is substituted by chlorine, cyano, hydroxyl, $C_1$-$C_4$-alkoxy, phenoxy, $C_2$-$C_5$-alkanoyloxy, which is unsubstituted or substituted by $C_1$-$C_4$-alkoxy or phenoxy, or $C_1$-$C_4$-alkyl substituted by carbo-$C_1$-$C_4$-alkoxy; allyl or phenyl-$C_1$-$C_4$-alkyl; or a group $$-N\begin{matrix}R^{18}\\R^{19}\end{matrix}$$

is a saturated or partially unsaturated heterocyclic five-membered or six-membered ring which may furthermore contain an oxygen atom or a further nitrogen atom as a ring member;

Y is hydrogen, hydroxyl, methyl or ethyl;

Y is a group $$-O-\underset{\underset{O}{\|}}{C}-R^{20}$$

where $R^{20}$ is straight-chain or branched $C_1$-$C_{12}$-alkyl or is phenyl which is unsubstituted or substituted by $C_1$-$C_4$-alkyl or $C_1$-$C_4$-alkoxy;

Y is a group $$-\underset{R^{21}}{N}-\underset{\underset{O}{\|}}{C}-R^{22}$$

where $R^{21}$ is hydrogen or $C_1$-$C_4$-alkyl and $R^{22}$ has the following meanings: hydrogen, straight-chain or branched $C_1$-$C_{12}$-alkyl, trifluoromethyl, chloromethyl, $C_1$-$C_4$-alkoxymethyl, phenoxymethyl, where one hydrogen atom or two hydrogen atoms in the phenoxy radical may be substituted by chlorine, methoxy, nitro or $C_1$-$C_4$-alkyl and, in the case of two substituents, these may be identical or different; phenylthiomethyl, where the phenyl radical is unsubstituted or substituted by $C_1$-$C_4$-alkyl; benzyl; phenylethyl; $C_3$-$C_7$-cycloalkyl; phenyl which is unsubstituted or substituted by $C_1$-$C_{12}$-alkyl, $C_1$-$C_{12}$-alkoxy or nitro; $H_5C_6$—CH=CH—, or —CH₂—PO(OR²³)₂, where $R^{23}$ is $C_1$-$C_4$-alkyl; Y is a group $$-\underset{R^{21}}{N}-SO_2-R^{24}$$

where $R^{21}$ has the abovementioned meanings and $R^{24}$ is $C_1$-$C_{12}$-alkyl, phenyl or $C_1$-$C_{12}$-alkylphenyl;

Y is N—$C_1$-$C_4$-alkylamino when $R^{18}$ and $R^{19}$ are each $C_1$-$C_4$-alkyl; or Y is N,N-di-$C_1$–$C_4$-alkylamino, N-pyrrolidinyl, N-piperidinyl or N-morpholinyl when the group

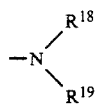

has the same meaning; and

Z is hydrogen or, where $R^{18}$ and $R^{19}$ are each $C_1$–$C_4$-alkyl or allyl and Y is a group

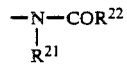

may furthermore be methoxy or ethoxy.

In addition to acetyl, benzoyl, 4-nitrophenyl, 4-cyanophenyl, carbamyl and cyano, other suitable radicals E in the isoindolenine dyes X to be used according to the invention are:

E1) carbo-$C_1$–$C_4$-alkoxy, such as carbomethoxy, carboethoxy, carbo-n-propoxy, carboisopropoxy, carbo-n-butoxy and carboisobutoxy;

E2) N-alkylcarbamyl where the alkyl radical is unsubstituted or substituted, such as methyl-, N-ethyl-, N-propyl-, N-butyl-, N-(3-methoxypropyl)-, N-(3-ethoxypropyl)-, N-(3-propoxypropyl)- and N-(3-butoxypropyl)-carbamyl, and E3) N-phenylcarbamyl where the phenyl radical may be unsubstituted or substituted, such as N-phenyl-, N-(4-methylphenyl)-, N-(2-methylphenyl)-, N-(4-ethoxyphenyl)-, N-(4-isopropylphenyl)-, N-(4-isobutylphenyl)-, N-(4-tert-butylphenyl)-, N-(4-methoxyphenyl)-, N-(4-ethoxyphenyl)- and N-(4-butoxyphenyl)-carbamyl.

Among these, cyano is preferred as radical E.

Examples of suitable radicals D are chlorine, methyl, ethyl, methoxy, ethoxy and butoxy, d being 1 or 2. D is preferably hydrogen.

Examples of suitable radicals $R^{18}$ in addition to hydrogen, are methyl, ethyl, 2-hydroxyethyl, when $R^{19}$ is cyclohexyl, phenyl or substituted phenyl, such as 4-ethylphenyl, 4-ethylphenyl, 4-methoxyphenyl, 4-ethoxyphenyl, 4-butoxyphenyl or 4-isopropylphenyl. When $R^{18}$ is hydrogen, $R^{19}$ is furthermore $C_1$–$C_4$-alkyl, such as methyl, ethyl, propyl, isopropyl, butyl, isobutyl or tert-butyl. Other specific examples of radicals $R^{18}$ and $R^{19}$ are:

i) unsubstituted or substituted $C_1$–$C_6$-alkyl, such as methyl, ethyl, n-propyl, n-butyl, pentyl, hexyl, 2-chloroethyl, 2-cyanoethyl, 2-hydroxyethyl, 2-ethoxyethyl, 2-propoxyethyl, 2-butoxyethyl, 2-phenoxyethyl, 2-(ethanoyloxy)-ethyl, 2-(propanoyloxy)-ethyl, 2-(butanoyloxy)-ethyl, 2-(pentanoyloxy)-ethyl, 2-(methoxyethanoyloxy)-ethyl, 2-(ethoxyethanoyloxy)-ethyl, 2-(phenoxyethanoyloxy)-ethyl, 2-(carbomethoxy)-ethyl, 2-(carboethoxy)-ethyl and 2-(carbobutoxy)-ethyl and 2-(carbopropoxy)-ethyl;

ii) allyl and phenyl-$C_1$–$C_4$-alkyl, such as benzyl, 2-phenylethyl, 2-phenylpropyl, 1-phenylpropyl and 2-phenylbutyl; or iii) the group

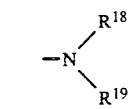

is a saturated or partly unsaturated five-membered or six-membered heterocyclic radical, such as N-pyrrolidinyl, N-piperidinyl, N-morpholinyl, N-piperazinyl, N'-$C_1$–$C_4$-alkylpiperazinyl having methyl, ethyl, propyl or butyl as the alkyl radical at the N' atom, pyrazolidin-1-yl, $\Delta^2$-3-methylpyrazolin-1-yl, $\Delta^2$-3,5,5-trimethylpyrazolin-1-yl, $\Delta^2$-3-methyl-5-phenylpyrazolin-1-yl, $\Delta^3$-3,5-diphenylpyrazolin-1-yl and N-imidazolyl.

Examples of suitable substituents Y in addition to hydrogen are hydroxyl, methyl and ethyl.

iv) the group

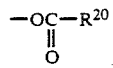

where $R^{20}$ is methyl, ethyl, propyl, butyl, hexyl, 1-ethylphenyl, heptyl, nonyl, undecyl, dodecyl, phenyl, 4-methoxyphenyl, 4-ethylphenyl, 4-methoxyphenyl or 4-ethoxyphenyl;

v) the group

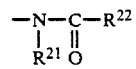

where $R^{21}$ is $C_1$–$C_4$-alkyl, such as methyl, ethyl or propyl, or, preferably, hydrogen and $R^{22}$ is hydrogen, trifluoromethyl, chloromethyl, benzyl, 2-phenylethyl, $C_6H_5$—CH=CH— or one of the following radicals:

α) $C_1$–$C_{12}$-alkyl, such as methyl, ethyl, n-propyl, isopropyl, butyl, isobutyl, 2-methylpropyl, tert-butyl, n-pentyl, 2,2-dimethylpropyl, 1-methylbutyl, 1-ethylpropyl, 1,1-dimethylpropyl, n-hexyl, 1,1-dimethylbutyl, 1,3-dimethylbutyl, heptyl, 1-ethylpentyl, 1-propylbutyl, 2,4-dimethylpentyl, octyl, nonyl, decyl, undecyl, 1,1-dimethylnonyl and dodecyl;

β) alkoxy-, phenoxy- and phenylthiomethyl, such as methoxymethyl, ethoxymethyl, propoxymethyl, butoxymethyl, phenoxymethyl, 2-, 3- and 4-isobutylphenoxymethyl, 4-tert-butyl-2-methylphenoxymethyl, 2,3-dimethylphenoxymethyl, 2,4-dimethylphenoxymethyl, 2,5-dimethylphenoxymethyl, 3,5-dimethylphenoxymethyl, 3,4-dimethylphenoxymethyl, 2-, 3- and 4-chlorophenoxymethyl, 4-nitrophenoxymethyl, phenylthiomethyl, 4-methylphenylthiomethyl and 4-tertbutylphenylthiomethyl;

δ) $C_3$–$C_7$-cycloalkyl, such as cyclopropyl, cyclobutyl, cyclopentyl, cyclohexyl and cycloheptyl;

δ) phenyl which is unsubstituted or substituted by alkyl, alkoxy or nitro, such as 2-, 3- and 4-methylphenyl, 2-, 3- and 4-ethylphenyl, 2-, 3- and 4-n-and isopropylphenyl, 2-, 3- and 4-n- and isobutylphenyl, 4-dodecylphenyl, 4-methoxyphenyl, 4-ethoxyphenyl, 4-n- and isopropoxyphenyl and 4-n- and isobutoxyphenyl;

ε) a radical of the formula —$CH_2$—$PO(OR^{23})_2$, where $R^{23}$ is methyl, ethyl, n- or isopropyl or n- or isobutyl; and vi) the group

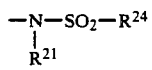

where $R^{21}$ is $C_1$–$C_4$-alkyl, such as methyl, ethyl or propyl, or, preferably, hydrogen and $R^{24}$ is one of the following radicals:

α) $C_1$–$C_{12}$-alkyl, such as methyl, ethyl, propyl, butyl, pentyl, hexyl, octyl, nonyl, decyl or dodecyl, or β) phenyl which is unsubstituted or substituted by $C_1$–$C_{12}$-alkyl, such as 2-, 3- and 4-methylphenyl, 2-, 3-and 4-ethylphenyl, 2-, 3- and 4-isopropylphenyl, 2-, 3- and 4-isobutylphenyl, 4-pentylphenyl, 4-hexylphenyl, 4-octylphenyl, 4-nonylphenyl, 4-decylphenyl and 4-dodecylphenyl.

Other suitable radicals Y are $C_1$–$C_4$-alkylamino, such as N-methylamino, N-ethylamino, N-propylamino and N-butylamino, when $R^{18}$ and $R^{19}$ are each $C_1$–$C_4$-alkyl.

Y may furthermore be N,N-di-$C_1$–$C_4$-alkylamino, such as N,N-dimethylamino, N,N-diethylamino, N,N-dipropylamino or N,N-dibutylamino, or N-pyrrolidinyl, N-piperidinyl, N-morpholinyl or N'-$C_1$–$C_4$-alkylpiperazinyl when the group

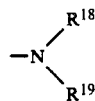

has the same meaning.

Z is preferably hydrogen.

Z may furthermore be methoxy or ethoxy when $R^{18}$ and $R^{19}$ are each $C_1$–$C_4$-alkyl or allyl and Y is a group

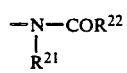

Preferred isoindolenine dyes X are those of the general formula Xa

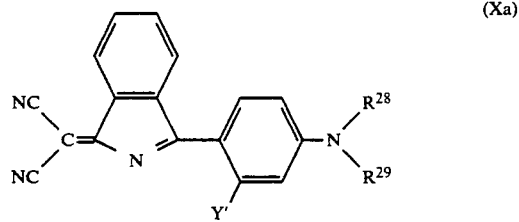

(Xa)

In formula Xa, Y' is hydrogen, hydroxyl, methyl or a group —O—$COR^{25}$, —NH—$COR^{26}$ or —NH—$SO_2R^{27}$, where $R^{26}$ is straight-chain or branched $C_1$–$C_{12}$-alkyl, methoxymethyl, phenoxymethyl which is unsubstituted or substituted in the phenoxy radical by methoxy or $C_1$–$C_4$-alkyl, phenylthiomethyl which is unsubstituted or substituted in the phenyl radical by $C_1$–$C_4$-alkyl, or Y' is benzyl, phenylethyl, phenyl, $C_1$–$C_{12}$-alkylphenyl, $C_6H_5$—CH=CH—, $C_3$–$C_7$-cycloalkyl, $C_1$–$C_4$-alkoxyphenyl, —$CH_2$—$PO(OCH_3)_2$, —$CH_2$—$PO(OC_3H_7)_2$ or —$CH_2$—$PO(OC_4H_9)_2$; $R^{27}$ is $C_1$–$C_{12}$-alkyl, or phenyl which is unsubstituted or substituted by $C_1$–$C_{12}$-alkyl and $R^{25}$ is $C_1$–$C_6$-alkyl or phenyl; and $R^{28}$ and $R^{29}$ are each $C_1$–$C_4$-alkyl, 2-hydroxyethyl, $C_1$–$C_4$-alkoxyethyl, 2-phenoxyethyl, 2-chloroethyl, 2-cyanoethyl, 2-(carbomethoxy)-ethyl, 2-(carboethoxy)-ethyl, 2-(propanoyloxy)-ethyl, 2-(ethanoyloxy)-ethyl, ally or benzyl, and $R^{28}$ and $R^{29}$ may be identical or different; or $R^{28}$ is hydrogen or methyl and $R^{29}$ is phenyl which is unsubstituted or substituted by methyl, ethyl, methoxy or ethoxy or is cyclohexyl; or the group

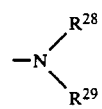

is N-pyrrolidinyl, N-piperidinyl, N-morpholinyl, pyrazolidin-1-yl, Δ²-3-methylpyrazolin-1-yl, Δ²-3,5,5-trimethylpyrazolin-1-yl, Δ²-3-methyl-5-phenylpyrazolin-1-yl, Δ³-3,5-diphenylpyrazolin-1-yl or N-imidazolyl.

Other suitable isoindolenine dyes Xa are those in which the group

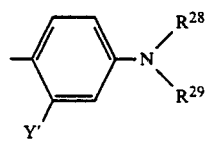

is

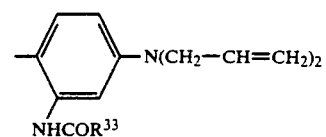

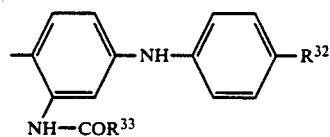

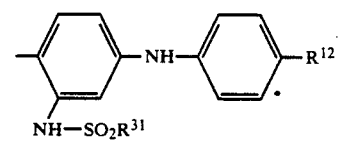

where $R^{30}$ is straight-chain or branched $C_1$-$C_{12}$-alkyl, methoxymethyl, phenoxymethyl which is unsubstituted or substituted in the phenoxy radical by methoxy or $C_1$-$C_4$-alkyl; $C_3$-$C_7$-cycloalkyl; phenyl which is unsubstituted or substituted by $C_1$-$C_4$-alkoxy or $C_1$-$C_4$-alkyl; benzyl, phenylethyl or $C_6H_5$—CH=CH—;

$R^{31}$ is $C_1$-$C_{12}$-alkyl, phenyl or $C_1$-$C_{12}$-alkylphenyl;

$R^{32}$ is hydrogen, methyl, ethyl, methoxy or ethoxy and $R^{33}$ is $C_1$-$C_6$-alkyl.

Examples of very particularly advantageous isoindolenine dyes Xa to be used according to the invention are the isoindolenine dyes Xa-1 to Xa-9.

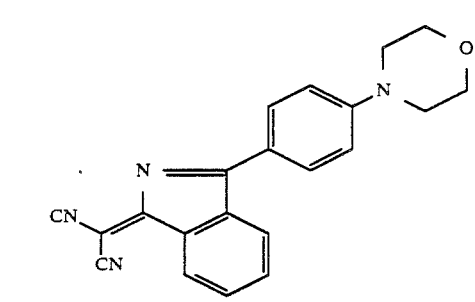
Xa-1

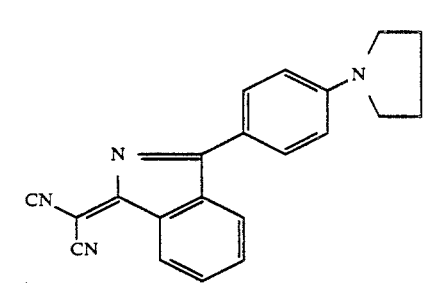
Xa-2

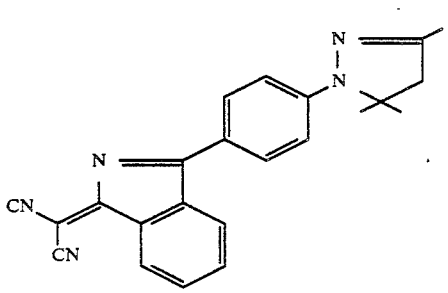
Xa-3

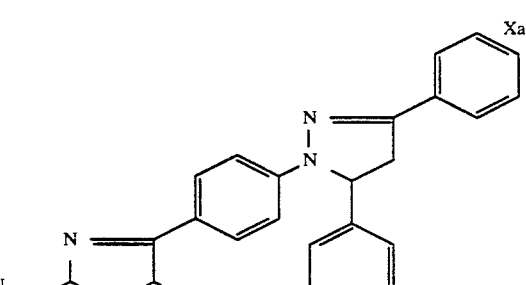
Xa-4

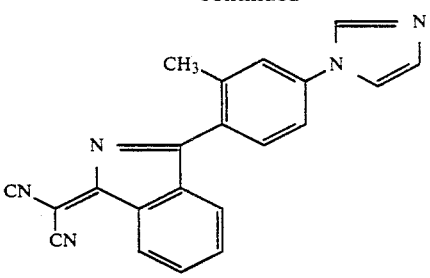
Xa-5

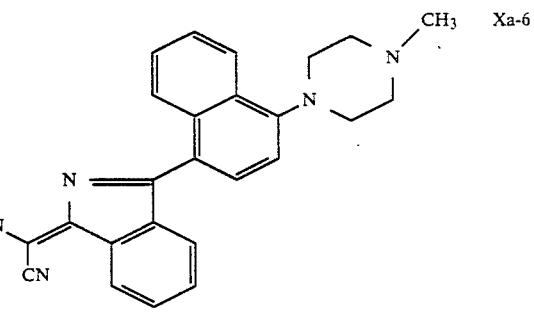
Xa-6

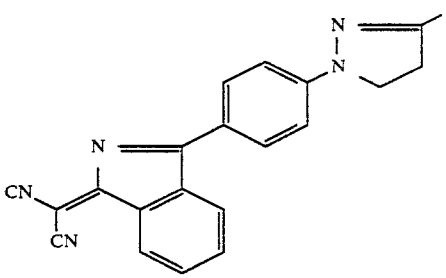
Xa-7

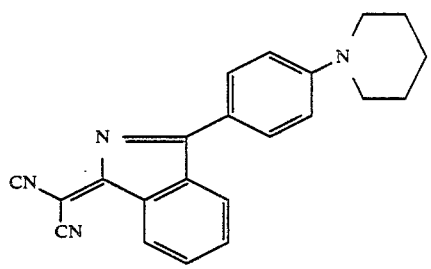
Xa-8

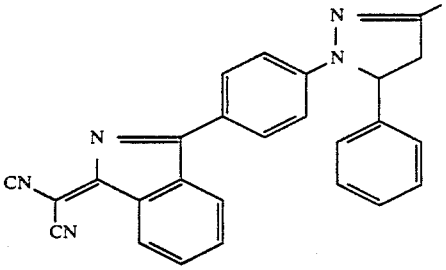
Xa-9

Among these in turn, the isoindolenine dye Xa-3 is particularly noteworthy.

Examples of isoindolenine dyes X and Xa to be used according to the invention, and their method of preparation, are disclosed in EP-A-0 017 132. The other isoindolenine dyes Xa can likewise be obtained by the known method of preparation. Their use as sensitizers (b₂) in electrophotographic recording elements is not disclosed in EP-A-0 017 132.

The sensitizers ($b_2$) to be used according to the invention are present in the novel photoconducting layer (B), in addition to the components ($b_1$), ($b_3$) and, if required, ($b_4$), in an amount of from 0.05 to 20, preferably from 0.1 to 18, advantageously from 0.5 to 15, in particular from 1.0 to 10, parts by weight per 100 parts by weight of binder ($b_1$).

If less than 0.05 part by weight of these sensitizers ($b_2$) are added to the novel photoconducting layer (B) per 100 parts by weight of ($b_1$), the photosensitivity of the said layer is unsatisfactory. If, on the other hand, more than 20 parts by weight of ($b_2$) are used per 100 parts by weight of ($b_1$), the conductivity in the dark may increase to an undesirable extent and the mechanical strength of the novel photoconducting layer (B) may decrease substantially, which, in spite of the excellent remaining properties of the novel photoconducting layer (B), is generally unacceptable. The range from 0.05 to 20 parts by weight of ($b_2$) per 100 parts by weight of ($b_1$) is thus an optimum within the limits of which the amount of ($b_2$) is freely selected and is further adapted to the particular technical problem, the particular intended use and/or the particular composition of the novel panchromatic electrophotographic recording element. The chosen amount of sensitizers ($b_2$) depends in particular on the amount of charge carrier-transporting compounds or photoconductors ($b_3$) and on whether further conventional sensitizers used as additives ($b_4$) are present in the photoconducting layer (B).

The sensitizers ($b_2$) to be used according to the invention are also used as separate sensitizer layer(s) ($b_2$), resulting in novel photoconducting multilayers (B), of which the novel photoconducting double layers (B) are advantageous. In these novel photoconducting double layers (B), the single layer of one or more sensitizers ($b_2$) and, if required, one or more binders ($b_1$) is present directly on the electrically conducting substrate (A) and is covered with a single layer which contains binders ($b_1$), photoconductors ($b_2$) and, if required, additives ($b_4$). The thickness of the novel sensitizer layer ($b_2$) is from 0.005 to 5 μm, preferably from 0.05 to 3 μm, advantageously from 0.08 to 2 μm, in particular from 0.1 to 0.9 μm. If the novel sensitizer layer ($b_2$) is thinner than 0.005 μm, it may no longer cover the surface of the substrate (A) completely and uniformly in certain circumstances and its sensitizing action, i.e. its charge carrier-producing action, may no longer be sufficient for a given technical problem. If the novel sensitizer layer ($b_2$) is thicker than 5 μm, this may make it more difficult for electrical charges to flow away during imagewise exposure to actinic light. Regarding the sensitization, i.e. the production of a sufficient number of charge carriers, the uniformity of the thickness, the adhesion to the substrate (A) and the avoidance of a certain blocking effect, the thickness range from 0.005 to 5 μm is thus optimum. Within this range, the thickness of the novel sensitizer layer ($b_2$) is freely selected and is further adapted to the particular technical problem, the particular intended use and/or the particular composition of the novel panchromatic electrophotographic recording element.

The particular novel photoconducting layer (B), whether the novel photoconducting single layer (B) or the novel photoconducting double layer (B), is chosen specifically for producing the novel panchromatic electrophotographic recording element depends primarily on the intended use of the said recording element.

Regardless of which novel photoconducting layer (B) is specifically used, it must contain (i) one of the dyes Victoria Blue FB (C.I. 44045), Crystal Violet FN (C.I. 42555), Rhodamine FB (C.I. 45170), Astrazone Orange R (C.I. 48040) or Astrazone Orange G (C.I. 48035) or two, three or four of these dyes or all five together, in addition to (ii) one or more of the naphtholactam dyes I and/or one or more of the isoindolenine dyes X or Xa, as sensitizers ($b_2$).

Examples of sensitizers ($b_2$) or sensitizer combinations ($b_2$) which are very particularly preferred according to the invention and which have an excellent technical effect are Victoria Blue FB+hodamine FB with the naphtholactam dye I-71, I-77, I-85, I-96 or I-97;

Victoria Blue FB+Rhodamine FB+Astrazone Orange G with the naphtholactam dye I-71, I-77, I-96 or I-97;

Crystal Violet FN+Astrazone Orange G with the naphtholactam dye I-17, I-77, I-85, I-96 or I-97;

Rhodamine FB+Astrazone Orange G with the naphtholactam dye I-97 and the isoindolenine dye Xa-3;

Rhodamine FB with the naphtholactam dye I-96 and the isoindolenine dye Xa-3;

Crystal Violet FN+Astrazone Orange G with the naphtholactam dye I-97 and the isoindolenine dye Xa-3 or with the naphtholactam dye I-85 and the isoindolenine dye Xa-3 or with Xa-3 alone;

Victoria Blue FB+hodamine FB with the isoindolenine dye Xa-3 or

Rhodamine FB with the isoindolenine dye Xa-3.

The ratio of the amounts of the sensitizers ($b_2$) can vary widely and depends primarily on the intended use of the novel panchromatic electrophotographic recording element. According to the invention, a ratio of Victoria Blue FB, Crystal Violet FN, Rhodamine FB, Astrazone Orange R and/or Astrazone Orange G to
the naphtholactam dyes I and/or the isoindolenine dyes X or Xa
of from 10:1 to 1:1, preferably from 8:1 to 2:1, advantageously from 7:1 to 2.5:1, and in particular from 6.5:1 to 3:1, is advantageous. In specific cases, however, other ratios may also be used, for example a ratio of from 1:6 to 1:1.5, in particular from 1:5.5 to 1:2, provided that it is particularly advantageous for the relevant sensitizer combination ($b_2$) and/or the relevant intended use.

The second essential component of the novel photoconducting layers (B) of the novel panchromatic electrophotographic recording element is the binder ($b_1$).

The type of suitable binders ($b_1$) for the novel photoconducting layers (B) depends on the intended use of the novel panchromatic electrophotographic recording elements. For the copying sector, for example, cellulose ethers, polyester resins, polyvinyl chlorides, polycarbonates, copolymers, such as styrene/maleic anhydride copolymers or vinyl chloride maleic anhydride copolymers, or mixtures of such binders ($b_1$) are suitable. Their film-forming and electrical properties, their adhesion to the substrate and their solubility properties play a particular role with regard to their choice. Particularly in novel panchromatic electrophotographic recording elements for the production of printing plates, in particular offset printing plates, particularly suitable binders ($b_1$) are those which are soluble in alkaline, aqueous or alcoholic solvents. These are, in particular, binders ($b_1$) having groups which impart solubility in alkalis, e.g.

anhydride, carboxyl, sulfo, phenol or sulfonimide groups. Preferred binders ($b_1$) are those which are readily soluble in basic aqueous alcoholic developers and have a mean molecular weight (weight average) of from 800 to 150,000, in particular from 1,200 to 80,000, in particular those having high acid numbers. Examples of suitable binders are copolymers of methacrylic acid and methacrylates, particularly copolymers of styrene and maleic anhydride and of styrene, methacrylic acid and methacrylates, provided that they meet the above solubility condition. Although it is known that binders ($b_1$) having free carboxyl groups generally increase the conductivity of photoconducting layers in the dark to an undesirable extent and may therefore lead to poor toning results, such binders can be readily adapted to the charge transport compounds or photoconductors ($b_3$) used. For example, we have found that copolymers of styrene, maleic anhydride and acrylic or methacrylic acid, which contain from 5 to 50% by weight of copolymerized maleic anhydride and from 5 to 35, in particular from 10 to 30, % by weight of copolymerized acrylic or methacrylic acid, give novel photoconducting layers (B) having low conductivity in the dark. They have excellent solubility in developers consisting of, for example, 75% by weight of water, 23% by weight of isobutanol and 2% by weight of sodium carbonate.

The third essential component of the novel photoconducting layer (B) of the novel panchromatic electrophotographic recording element is the charge carrier-transporting compound or the photoconductor ($b_3$). These are the known low molecular weight oxazole derivatives (DE-B-11 20 875), oxadiazole derivatives (DE-B-10 58 836), triazole derivatives (DE-B-10 60 260), azomethines (US-A-3 041 165), pyrazoline derivatives (DE-B-10 60 714), imidazole derivatives (DE-B-11 06 599), arylamines (DE-B-27 12 557), 1,3-dithiol derivatives (DE-B-33 38 204), benzotriazole derivatives (EP-A-0 131 292), triazolylpyridine derivatives (EP-A-0 150 419), pyrazolotriazole derivatives (EP-A-0 156 308), triphenyltriazole derivatives (EP-A-0 162 216) or hydrazone derivatives (EP-A-0 001 599, DE-A-29 19 791 △ US-A-4 367 273 and US-A-4 278 747, GB-A-2 088 074 or 1 40 571) which are conventionally used in the technical area under discussion, or the oligomeric or polymeric photoconductors poly(N-vinylcarbazole) or arylamine polymers (EP-A-0 052 961), which are likewise known and conventionally used.

The novel photoconducting layers (B) contain one or more of these photoconductors ($b_3$) in an amount of from 40 to 150, preferably from 40 to 130, advantageously from 50 to 120, in particular from 60 to 100, parts by weight per 100 parts by weight of the binder ($b_1$).

Furthermore, the novel photoconducting layer (B) may contain, based on its total quantity, not more than 30, preferably 25, advantageously 20, in particular 15, % by weight of additives.

Suitable additives are essentially only those which do not adversely affect the optical transparency of the novel photoconducting layer (B). The additives may have a very wide variety of functions. For example leveling agents, such as silicone oils, wetting agents, in particular nonionic substances, plasticizers based on chlorohydrocarbons or on phthalic esters, adhesion promoters organic and inorganic fillers and reinforcing fillers which can be mixed in to give a mixture which is not molecularly disperse and/or the metal acetylacetonates disclosed in EP-A-0 131 215 may furthermore be added to the novel photoconducting layer (B). In addition, the layer (B), if it is in the form of a photoconducting multilayer (B), may contain, in the separate sensitizer layer or layers ($b_2$), charge carrier-producing pigments from the classes consisting of the azo, phthalocyanine, isoindolenine and/or perylene dyes. These pigments can, however, also be present as an additional separate sensitizer layer.

Accordingly, the novel photoconducting layer (B) consists of from 70 to 100, preferably from 75 to 100, advantageously from 80 to 100, in particular from 85 to 100, % by weight of a panchromatic photoconducting mixture (B) of the components ($b_1$), ($b_2$) and ($b_3$) and of from 0 to 30, preferably from 0 to 25, advantageously from 0 to 20, in particular from 0 to 15, % by weight of additives ($b_4$), the percentages being based on the total amount of the said layer.

The panchromatic photoconducting mixture (B) consists of
100 parts by weight of a binder ($b_1$) or of a plurality of binders ($b_1$),
from 0.05 to 20, preferably from 0.1 to 18, advantageously from 0.5 to 15, in particular from 1.0 to 10, parts by weight of a sensitizer combination ($b_2$) to be used according to the invention and from 40 to 150, preferably from 40 to 130, advantageously from 50 to 120, in particular from 60 to 100, parts by weight of a photoconductor ($b_3$) or of a plurality of photoconductors ($b_3$).

If the novel photoconducting layer (B) is not in the form of a multilayer but in the form of a single layer, its thickness is from 0.5 to 40 $\mu$m, preferably from 0.8 to 25 $\mu$m, advantageously from 1 to 20 $\mu$m, in particular from 1.5 to 15 $\mu$m.

If the novel photoconducting layer (B) is in the form of a multilayer, in particular a double layer, the thickness of the sensitizer layer ($b_2$) containing the sensitizers ($b_2$) is, as stated above, from 0.005 to 5 $\mu$m, preferably from 0.05 to 3 $\mu$m, advantageously from 0.08 to 2 $\mu$m, in particular from 0.1 to 0.9 $\mu$m, and the total thickness of the novel photoconducting double layer (B) is from 2 to 30 $\mu$m, preferably from 3 to 25 $\mu$m, advantageously from 3.5 to 20 $\mu$m, in particular from 5 to 15 $\mu$m.

In addition to the novel photoconducting layer (B), the electrically conducting substrate (A) is the other essential component of the novel panchromatic electrophotographic recording element. All electrically conductive substrates can in principle be used for this purpose, provided that they can be processed to dimensionally stable thin sheet or films. Depending on the intended use of the said recording element, aluminum, zinc, magnesium, copper, steel or multimetal sheets, polymer films having a metallized surface, such as polyethyleneterephthalate films coated with aluminum by vapor deposition, or special electrically conducting papers are used. In particular, the raw or pretreated aluminum sheets or foils, such as those typically used for offset printing plates, are preferred for this purpose. The pretreatment of the aluminum sheets or foils comprises chemical, mechanical or electrochemical roughening of the surface and/or anodic oxidation with formation of a porous alumina layer, if necessary followed by sealing of the relevant oxide layer. In general, the substrates (A) are from 50 $\mu$m to 1.5 mm, in particular from 80 $\mu$m to 0.6 mm, thick, depending on the intended use of the recording elements.

The novel panchromatic electrophotographic recording elements may also contain one or more further layers which serve to perform the function of the recording elements. This further layer may be one of the known, additional sensitizer layers described above, which are arranged between the substrate (A) and the novel photoconducting layer (B). Furthermore, the layers of, for example, particulate titanium dioxide, zinc oxide, α-iron(III) oxide, barium titanate, alumina or cerium oxide, which are disclosed in DE-B-25 04 545 can be used. Layers of inorganic photoconductors, such as selenium or cadmium sulfide are also suitable as additional components of the recording elements. The top layers of silicon monoxide, magnesium fluoride or calcium fluoride disclosed in EP-A-0 046 960 may also be present.

The production of the novel panchromatic electrophotographic recording element requires no special methods, but the novel photoconducting layer (B) is produced by the conventional, known methods for the preparation of thin organic layers, and the electrically conducting substrates (A) are produced by the conventional, known methods for the preparation of thin metal sheets or foils and polymer films coated with metal by vapor deposition.

In an advantageous procedure for the production of the novel photoconducting layers (B), the components of the said layers (B) are dissolved in suitable solvents, and the resulting solutions are poured onto the substrates (A) in such a way that, after the wet layers have dried, the novel photoconducting layers (B) of the desired uniform thickness result. If the said layers (B) are to be in the form of double layers or multilayers ($b_2$), the sensitizer layers ($b_2$) are first produced in the desired thickness and number by casting from solution and drying the wet layers on the surface of the substrates (A). Thereafter, these sensitizer layers ($b_2$) are covered with layers of the components ($b_1$), ($b_3$) and, if required, ($b_4$) by casting from solution and drying of the wet layers, care being taken to ensure that the solvents used here do not damage the sensitizer layers ($b_2$) present. The preparation of the relevant casting solutions is carried out by the conventional, known mixing and dissolution methods.

If the novel panchromatic electrophotographic recording element is to contain further layers in addition to the novel photoconducting layer (B), these further layers are produced by known methods which are conventionally used and typical for the production of the relevant layers. The order in which the individual process steps are carried out here does of course depend on the desired structure of the recording element, or the order is determined by the structure.

The novel panchromatic electrophotographic recording element has many excellent properties which could not be realized to date in type and number by known recording elements. This previously unachievable combination of excellent properties gives rise to a particular unexpected technical effect which is advantageously evident not only in the novel recording elements themselves but in particular also in the subsequent products produced therefrom, the drums in photocopiers, the offset printing plates and the photoresist images, and not least in the photocopies, printed products and printed circuit boards produced with these.

Thus, the novel panchromatic electrophotographic recording element has a very low conductivity in the dark, coupled with a high electrostatic charge capacity, particularly high sensitivity to actinic light and excellent electrokinetic properties. This property profile results in an excellent, high-contrast reproduction of originals, extremely true to detail, in shorter times than has been possible to date, which is a particularly important advantage for a reprographic company in practice.

Furthermore, the imagewise exposed, novel panchromatic electrophotographic recording element shows no tendency at all to scumming in the non-image areas, considerably improving or even permitting the high-contrast reproduction of critical fine image elements in originals, for example the reproduction of fine dots in pale tonal value ranges. In spite of its high sensitivity to actinic light, the novel panchromatic electrophotographic recording element is simple to handle, so that no special precautions need be taken in this respect. Because of this high sensitivity to actinic light and the particularly rapid photo-induced drop due to this, and because the law $$I \cdot t = \text{constant}$$

(I=light intensity; t=time) is also valid in the nanosecond range, the said recording element can make full use of the advantages of modern exposure methods. It is therefore suitable not only for conventional imagewise exposure by means of incandescent lamps and fluorescent tubes which emit light in the ultraviolet and/or visible wavelength range but also for imagewise exposure by means of pulse-modulated or analogously modulated laser beams which are passed over the novel recording element. Thus, the modern, computer-controlled laser exposure units can be used for imagewise exposure, the said units giving very particularly outstanding images owing to the advantageous properties of the novel recording element. It is possible to use not only exposure units which operate with laser light in the visible wavelength range but also those which use laser light in the infrared wavelength range. Because of the particular properties of the novel recording element, this immediately has the further advantage that economical and easily produced compact semiconductor lasers for example GaAlAs or GaAlInP lasers, can be used, making the exposure process as such in general considerably more efficient, more variable and more economical.

Furthermore, the novel panchromatic electrophotographic recording element appears to the human eye as dark or black, dark meaning hues such as dark blue, dark red, dark green, dark violet or dark brown. A latent charge image produced on the novel recording element can therefore be toned not only with the conventional, known liquid or solid black toners but very particularly advantageously with liquid or solid pale toners. Here, "pale toners" means toners having, for example, a pale yellow, pale brown, pale red, pale green, pale blue or pale violet hue. The use of these pale toners makes it possible to check the high-contrast toner-containing charge image with the naked eye, i.e. visually, which is an important advance in the field of electrophotographic recording elements. This important advance is due directly to the particular advantageous properties of the novel panchromatic electrophotographic recording element. Additional advantages result from the use of pale liquid toners.

Examples of toners suitable according to the invention are the conventional, known toners as described in, for example, US-A-4 661 431. Examples of pale toners suitable according to the invention are the conventional, known toners with which suitable lightening pigments, for example titanium dioxide or silica, have been mixed.

The novel panchromatic electrophotographic recording element has substantial advantages when used in the photocopying sector. For example, it can be applied in a simple manner to the drums usually present in photocopiers and, in this form, permits the production of excellent photocopies, even of yellowed originals, in large numbers and in a very short cycle time. Furthermore, these drums can be disposed of in a simple and environmentally safe manner after their advantageously long life. The photocopies produced therewith have particularly high contrast, are true to detail even in the problematic image elements and are free of toner in the nonimage areas. In addition, when pale liquid or solid toners are used, the toner-containing latent image on the drum can be checked visually if this is necessary. Not least, however, the pale toner image can be transferred to a colored or dark surface, for example to brown, yellow, blue, green, red or violet paper, resulting in novel potential applications in the photocopying sector. It is particularly advantageous if the hue of the particular toner used contrasts greatly with the hue of the relevant surface.

The novel panchromatic electrophotographic recording element also has substantial advantages when used as a photoresist. For this intended use, it is applied to substrates (A) which are usually used for the production of printed circuit boards. Thereafter, it is exposed imagewise to actinic light, the abovementioned advantages of modern exposure methods being fully displayed here too. A toner image is then produced on the exposed recording element in a conventional manner using etchant-resistant toners and is fixed by heating, after which the toner-free nonimage areas are removed with suitable developers. This gives an excellent photoresist image which is true to detail and free of pitting, underwashing of the relief side walls and edge fragmentation, adheres excellently to the substrate (A) and is very resistant to the etching chemicals and electroplating baths usually used. Defect-free printed circuit boards whose life is advantageously long are obtained with the aid of this method, substantially without spoilage. If etchant-resistant, liquid or solid pale toners, in particular liquid ones, are used, the latent charge image can be checked visually before being fixed. For industrial production, this means an additional possibility for quality control, with the result that the success of the method, which in any case is excellent, is even further increased, the method far surpassing what was thought possible to date.

The novel panchromatic electrophotographic recording element has particularly substantial advantages when it is used for the production of offset printing plates, which is effected in a conventional, known manner by
1. providing the said recording element with a negative or positive charge by means of a high voltage corona,
2. exposing the said recording element imagewise to actinic light so that a latent electrostatic charge image is produced,
3. developing the latent electrostatic charge image by means of dry or liquid toner, resulting in a toner image,
4. fixing the toner image by heating and by
5. washing away (stripping) the toner-free nonimage areas of the novel photoconducting layer (B) by means of a suitable developer, with the result that the hydrophilic surface of the substrate (A) is bared.

The novel panchromatic electrophotographic recording element can be subjected to a particularly high voltage and exposed imagewise within a short time, and the advantages of modern exposure methods, in particular exposure to red or infrared laser light, can be made full use of. This rapidly and reliably gives high-contrast latent charge images which are completely true to detail and which give toner images which are completely free of toner in the nonimage areas. This reprographic precision furthermore permits the use of toners which would otherwise not have been considered, and the entire production process can thus be varied more widely and better adapted to specific technical problems. After fixing of the toner image, the nonimage areas are readily removed without subsequent damage to the toner image. A large number of different developers can be used for this purpose. The choice of the developer depends primarily on the composition of the original novel photoconducting layer (B), the solubility or swellability of the binder ($b_1$) present therein being the essential parameter. Because of the improved mutual adaptation of the toner materials and the components of the original novel photoconducting layer (B) which is now possible, developers having considerably greater dissolving power and/or washout methods which employ higher solvent pressure or brush pressure can be used. This results in a shorter development time without the image areas being damaged.

Moreover, liquid or solid, in particular liquid, pale toners can be very particularly advantageously used in this process. As a result, the high-contrast toner-containing charge image can be visually checked before being fixed, so that in the rare cases when a defective image has resulted, corrections can be made at as early a stage as this process step, instead of having to wait until the process is complete. If, in fact, image defects are found in the visual check prior to fixing, the process can be interrupted and the novel recording element reprocessed and fed to the process again.

The offset printing plate obtained thereafter reproduces in the highest quality even those image elements which are otherwise difficult to reproduce reliably. It can be further prepared in a conventional manner for offset printing, for example by rendering it hydrophilic and gumming it, in order further to increase the quality of the offset printing plate, which in any case is excellent.

During printing on an offset printing press with offset printing inks of the oil-in-water type, the printing areas of the offset printing plate show excellent acceptance of the oily inks, whereas their stripped areas are outstandingly water-conveying. This gives excellent contrast and an extremely precise print, leading overall to excellent printed copies. Since the offset printing plate has an advantageously long life under the printing conditions, a long print run is also achieved.

EXAMPLES

In Examples 1 to 22 below, the performance characteristics of the novel recording elements in the xerographic process (Carlson process) were determined. For this purpose, the novel recording materials (Examples 1 to 22) were prepared and then charged uniformly in a conventional manner using a d.c. voltage corona of $+8.5$ kV or $-8.5$ kV from a distance of 1 cm within 20 seconds to a surface potential of not more than +1000 or −1000 V and thereafter exposed uniformly or imagewise. The individual process steps were of course carried out under exactly comparable conditions in each case, so that the measured voltage drop induced by the uniform exposure for one second (=photo-induced drop PID in %, original value=100%) and the value of $E_{max}$ (potential acceptance in kV) and $E_{min}$ (residual potential after uniform exposure, in kV), the conductivity in the dark (potential drop in the dark as a % of the original value) and $\tau_{\frac{1}{2}}$ (half life of the PID in ms) clearly confirmed the advantageous properties of the novel recording materials. Furthermore, the optical density OD of the novel photoconducting layer (B) was determined in a conventional manner using a densitometer.

EXAMPLES 1 TO 22

Production and performance characteristics of the novel panchromatic electrophotographic recording elements General experiment method:

1.088 g of a copolymer which contained 52% by weight of styrene, 28% by weight of methacrylic acid and 20% by weight of maleic anhydride as copolymerized units (binder $b_1$) were dissolved in each case in 16 g of 1:1 dimethoxyethane/diethylene glycol dimethyl ether in the course of 30 minutes. 0.36 g of 2,5-bis-(4'-diethylaminophen-1'-yl)-1,3,4-oxadiazole and 0.540 g of 2-[4'-N-ethyl-N-phenylaminophen-1'-yl]-5-methoxybenzotriazole (photoconductor $b_3$) were added to the resulting copolymer solutions and stirring was continued for a further 15 minutes. Thereafter, the sensitizers ($b_2$) were added in the amounts shown in Table 1. The resulting solutions were cast on 0.30 mm thick, electrochemically roughened and anodically oxidized aluminum sheets (substrate A) and dried so that 5 μm thick novel photoconducting layers (B) (Examples 1 to 22) resulted.

These layers (B) were negatively charged and then exposed by means of a high-pressure xenon lamp. The resulting photo-induced voltage drop and the other performance characteristics were measured inductively in a known manner. The results of the experiment are shown in Table 2.

TABLE 1

The novel recording elements 1 to 22; type and amount of sensitizers ($b_2$) used in each case

| Example No. | Selected sensitizers ($b_2$) from the group consisting of the triarylmethane, xanthene and cyanine dyes (g) | Naphtholactam dyes I (g) | Isoindolenine dyes X or Xa (g) |
|---|---|---|---|
| 1 | Victoria Blue FB, C.I. 44045 (0.025) Rhodamine FB, C.I. 45170, (0.010) | I-71 (0.006) | — |
| 2 | As for Example 1 | I-77 (0.006) | — |
| 3 | As for Example 1 | I-85 (0.006) | — |
| 4 | As for Example 1 | I-97 (0.006) | — |
| 5 | As for Example 1 | I-96 (0.006) | — |
| 6 | Victoria Blue FB, C.I. 44045, (0.025) Rhodamine FB, C.I. 45170, (0.010) Astrazone Orange R, C.I. 48040, (0.006) | I-71 (0.006) | — |
| 7 | As for Example 6 | I-77 (0.006) | — |
| 8 | As for Example 6 | I-85 (0.006) | — |
| 9 | As for Example 6 | I-97 (0.006) | — |
| 10 | As for Example 6 | I-96 (0.006) | — |
| 11 | Astrazone Orange G, C.I. 48035, (0.010) Crystal Violet FN, C.I. 42555, (0.025) | I-71 (0.006) | — |
| 12 | As for Example 11 | I-77 (0.006) | — |
| 13 | As for Example 11 | I-85 (0.006) | — |
| 14 | As for Example 11 | I-97 (0.006) | — |
| 15 | As for Example 11 | I-96 (0.006) | — |
| 16 | Rhodamine FB, C.I. 45170, (0.010) Astrazone Orange G, C.I. 48035, (0.006) | I-97 (0.006) | Xa-3 (0.025) |
| 17 | Rhodamine FB, C.I. 45150, (0.010) | I-96 (0.006) | Xa-3 (0.025) |
| 18 | Crystal Violet FN, C.I. 42555, (0.025) Astrazone Orange R, C.I. 48040, (0.010) | I-97 (0.006) | Xa-3 (0.006) |
| 19 | As for Example 18 | I-85 (0.006) | Xa-3 (0.006) |
| 20 | As for Example 18 | — | Xa-3 (0.006) |
| 21 | As for Example 18 | — | Xa-3 (0.006) |
| 22 | Rhodamine FB, C.I. 45170 (0.010) | — | Xa-3 (0.025) |

TABLE 2

| | Novel photoconducting layer (B) | | Novel photoconducting layer (B) | | | Test in the Carlson process | |
|---|---|---|---|---|---|---|---|
| Example No. | Colour | Optical density OD (white light) | Potential acceptance $E_{max}$ kV | Residual potential $E_{min}$ kV | Conductivity in the dark DLF % | Photo-induced voltage drop PID % | Photo halflife $\tau_{\frac{1}{2}}$ ms |
| 1 | dark blue | 1.17 | 92 | 19.2 | 16.6 | 74.8 | 318 |
| 2 | dark blue | 1.14 | 60 | 16.5 | 17.6 | 66.8 | 402 |
| 3 | dark blue | 1.21 | 100 | 18.4 | 15.6 | 78.3 | 328 |
| 4 | dark blue | 1.25 | 109 | 20.4 | 16.0 | 77.7 | 329 |
| 5 | dark blue | 1.25 | 114 | 20.6 | 15.1 | 78.6 | 308 |
| 6 | dark blue | 1.29 | 91 | 15.2 | 16.5 | 80.0 | 326 |
| 7 | dark blue | 1.31 | 59 | 16.1 | 18.6 | 66.7 | 417 |
| 8 | dark blue | 1.30 | 97 | 17.0 | 16.9 | 78.9 | 324 |
| 9 | dark blue | 1.34 | 101 | 17.3 | 17.8 | 79.3 | 331 |
| 10 | dark blue | 1.30 | 103 | 17.8 | 19.0 | 78.7 | 319 |
| 11 | violet | 1.40 | 99 | 14.8 | 17.7 | 81.9 | 304 |
| 12 | violet | 1.40 | 83 | 13.2 | 16.1 | 81.1 | 357 |
| 13 | violet | 1.38 | 111 | 14.5 | 16.8 | 84.3 | 297 |
| 14 | violet | 1.34 | 111 | 14.7 | 16.2 | 84.2 | 297 |
| 15 | violet | 1.33 | 107 | 15.3 | 18.1 | 82.6 | 311 |
| 16 | dark red | 0.55 | 88 | 19.6 | 28.1 | 69.2 | 387 |
| 17 | dark red | 1.40 | 95 | 22.2 | 28.7 | 67.1 | 389 |
| 18 | violet | 1.40 | 96 | 16.3 | 20.8 | 78.6 | 331 |
| 19 | violet | 1.40 | 101 | 15.1 | 21.0 | 81.1 | 316 |
| 20 | violet | 1.44 | 116 | 13.7 | 23.3 | 84.6 | 316 |
| 21 | blue | 1.21 | 117 | 17.7 | 17.6 | 82.1 | 308 |

TABLE 2-continued

| | Novel photoconducting layer (B) | | Experimental results Novel photoconducting layer (B) | | | Test in the Carlson process | |
|---|---|---|---|---|---|---|---|
| Example No. | Colour | Optical density OD (white light) | Potential acceptance $E_{max}$ kV | Residual potential $E_{min}$ kV | Conductivity in the dark DLF % | Photo-induced voltage drop PID % | Photo halflife $\tau_{\frac{1}{2}}$ ms |
| 22 | dark red | 0.46 | 106 | 23.4 | 29.7 | 68.8 | 409 |

EXAMPLES 23 AND 24

The production of offset printing plates from novel panchromatic electrophotographic recording elements Example 1 was repeated twice, except that the two novel recording elements, after being charged in a laser recorder from Hope, were exposed imagewise with the aid of a helium/neon laser (wavelength λ of the main emission=633 nm), the recording speed at an image dot repetition rate of 3.8 MHz with 193 m.s$^{-1}$, corresponding to 42 cm$^2$.s$^{-1}$ of exposed surface, the plate being advanced in 27 μm steps.

After the imagewise exposure, one novel recording material was treated with toner, the toner used being carbon black dispersed in a thermoplastic (Example 23).

The other novel recording material, on the other hand, was treated with a liquid pale toner (Example 24). The said toner was prepared as described in Example 1 of US-A-4 661 431, except that the amount of the color-imparting pigments Phthalocyanine Green and Alkali Blue G was reduced and a corresponding amount of lightening titanium dioxide pigment was incorporated. The simple but exact visual check of the image quality prior to fixing indicated excellent image quality in Example 24, the nonimage areas of the novel recording element 24 being toner-free.

Because of the poor optical contrast between the toner image and the novel photoconducting layer (B), visual checking of the toner image prior to fixing in Example 23 was associated with some uncertainty, so that it was impossible to make any clear assessment of the image quality after treatment with toner.

After the visual check, the two resulting toner images were fixed by heating to 100° C. Only thereafter was it possible to see that the novel recording element 23 was likewise completely toner-free in the nonimage areas.

Thereafter, the two novel recording elements 23 and 24 were developed by wiping with a developer consisting of 0.5% by weight of sodium carbonate, 0.3% by weight of waterglass, 25% by weight of n-propanol and 74.2% by weight of water, with the result that, in the nonimage areas, the surface of the substrates (A) was bared. In this way, the typical differentiation for offset printing plates in hydrophilic and oleophilic areas was achieved, the bared parts of the surface of the substrates (A) forming the hydrophilic areas.

The two offset printing plates 23 and 24 were then washed with water, and the hydrophilic character of the bared substrate surface was further increased by wiping with dilute phosphoric acid.

After inking with an offset printing ink of the oil-in-water type, printing was carried out with the two offset printing plates 23 and 24 in an offset printing press.

The two offset printing plates 23 and 24 gave excellent printed copies in a long print run, the said copies being completely true to the original and meeting the highest quality requirements.

EXAMPLE 25

Preparation of the isoindolenine dye Xa-3 used according to the invention; experimental method:

5 g of the isoindolenine derivative

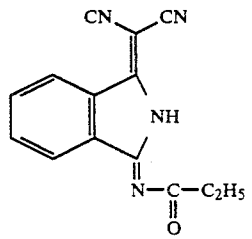

and 4.13 g of the pyrazoline derivative

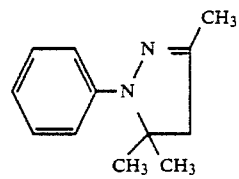

were refluxed together with 2 drops of concentrated sulfuric acid in 20 ml of toluene for 2 hours, while stirring. The resulting reaction mixture was then cooled, the crude product Xa-3 being precipitated as a solid. The crude product was separated off and washed first with methanol and then with hot water. This gave the pure isoindolenine dye Xa-3

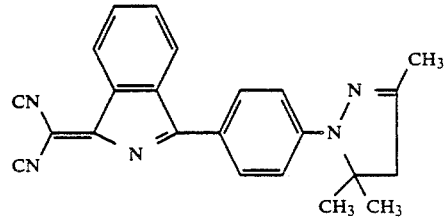

in a yield of 40%, based on the isoindolenine derivative. The elemental composition of Xa-3 corresponded to the theoretical values. The absorption spectrum of Xa-3 had three maxima at 297, 316 and 610.5 nm in the spectral range from λ=270 to λ=750 nm.

We claim:

1. A panchromatic electrophotographic recording element comprising
A) an electrically conducting substrate and
B) one or more photoconducting layers consisting essentially of
(b$_1$) one or more binders,
(b$_2$) several charge carrier-producing compounds or sensitizers, one or more of which are selected from the group consisting of Victoria Blue FB (C.I.

44045), crystal violet FN (C.I. 42555), rhodamine FB (C.I. 45170), strazone Orange R (C.I. 48040) and strazone range G (C.I. 48035), and one or more further compounds or sensitizers selected from the group consisting of the naphtholactam dyes which contain one or more chromophores of the general basic structure

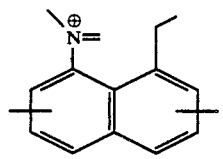

and the isoindolenine dyes which contain one or more chromophores of the general basic structure

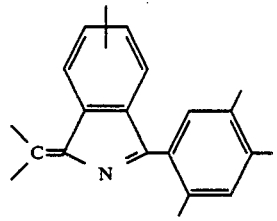

and (b3) one or more charge carrier-transporting compounds (photoconductors).

2. A panchromatic electrophotographic recording element as defined in claim 1, wherein the photoconducting layer (B) contains additives (b4).

3. A panchromatic electrophotographic recording element as defined in claim 1, wherein the photoconducting layer (B) is a multilayer which contains one or more sensitizer layers (b2) and a layer of binders (b1), and photoconductors (b3).

4. A panchromatic electrophotographic recording element as defined in claim 2, wherein the photoconducting layer (B) is a multilayer which contains a sensitizer layer (b2) of naphtholactam dyes and/or isoindolenine dyes and a sensitizer layer (b2) of Victoria Blue FB (C.I. 44045), Crystal Violet FN (C.I. 42555), Rhodamine FB (C.I. 45170), Astrazone Orange R (C.I. 48040) and/or Astrazone Orange G C.I. 48035).

5. A panchromatic electrophotographic recording element as defined in claim 1, wherein a further sensitizer layer of a conventional pigment is present between the electrically conducting substrate (A) and the photoconducting layer (B).

6. A panchromatic electrophotographic recording element as defined in claim 1, wherein a further photoconducting layer of a conventional photoconductor (b3) is present on the substrate (A).

7. A panchromatic electrophotographic recording element as defined in claim 1, for the production of printing plates, comprising an electrically conducting substrate (A) which is suitable for printing plates having a thickness from 80 µm to 0.6 mm and one or more photoconducting layers (B).

8. A panchromatic electrophotographic recording element as defined in claim 7, wherein the binders (b1) of the photoconducting layer(s) (B) are soluble or swellable in aqueous alkaline or aqueous alcoholic developers.

9. A panchromatic electrophotographic recording element as defined in claim 8, wherein the binder (b1) is a copolymer of styrene, maleic anhydride and acrylic acid and/or methacrylic acid, which copolymer contains from 5 to 50% by weight of maleic anhydride and from 5 to 35% by weight of acrylic acid and/or methacrylic acid as copolymerized units, the percentages being based on the total amount of the copolymer.

10. A process for the production of an offset printing plate from an electrophotographic recording element, the said process comprising the steps of (i) imagewise exposure of a negatively or positively charged electrophotographic recording element to actinic light, with the result that a latent electrostatic charge image is produced, the said electrophotographic recording element comprising A) an electrically conducting substrate having a hydrophilic surface and B) one or more photoconducting layers consisting essentially of (b1) one or more binders, (b2) several charge carrier-producing compounds or sensitizers, one or more of which are selected from the group consisting of Victoria Blue (C.I. 44045), Crystal Violet FN (C.I. 42555), Rhodamine FB (C.I. 45170), Astrazone Orange R C.I. 48040) and Astrazone Orange G (C.I. 48035), and one or more further compounds or sensitizers selected from the group consisting of the naphtholactam dyes which contain one or more chromophores of the general basic structure

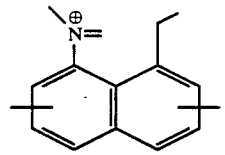

and the isoindolenine dyes which contain one or more chromophores of the general basic structure

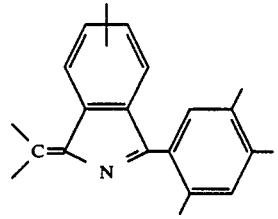

and (b3) one or more charge carrier-transporting compounds (photoconductors);

(ii) developing the latent electrostatic charge image by means of a toner, resulting in a toner-containing image, (iii) fixing the toner-containing image by heating and (iv) washing away (stripping) the toner-free nonimage areas of the electrophotographic recording element with a developer, with the result that the hydrophilic surface of the electrically conducting substrate (A) is bared and the said offset printing plate is obtained.

11. A process as defined in claim 10, wherein development (ii) is carried out with a toner which contrasts visually with the surface of the electrophotographic recording element.

12. A process as defined in claim 11, wherein a pale liquid toner is used.

13. A process as defined in claim 10, wherein the panchromatic electrophotographic recording element contains an electrically conducting substrate (A) suitable for printing plates and having a thickness of from 80 μm to 0.6 mm and one or more photoconducting layers (B).

14. A process as defined in claim 10, wherein the binders ($b_1$) of the photoconducting layer(s) (B) are soluble or swellable in aqueous alkaline or aqueous alcoholic developers.

15. A process as defined in claim 14, wherein the binder ($b_1$) is a copolymer of styrene, maleic anhydride and acrylic acid and/or methacrylic acid, which copolymer contains
from 5 to 50% by weight of maleic anhydride and
from 5 to 35% by weight of acrylic acid and/or methacrylic acid
as copolymerized units, the percentages being based on the total weight of the copolymer.

16. A process for the production of a photoresist image from an electrophotographic recording element, the said process comprising the steps of
 (i) imagewise exposure of a negatively or positively charged electrophotographic recording element to actinic light, with the result that a latent electrostatic charge image is produced, the said electrophotographic recording element comprising
  A) an electrically conducting substrate having and
  B) one or more photoconducting layers consisting essentially of
  ($b_1$) one or more binders,
  ($b_2$) several charge carrier-producing compounds or sensitizers, one or more of which are selected from the group consisting of Victoria Blue FB (C.I. 44045), Crystal Violet FN (C.I. 42555), Rhodamine FB (C.I. 45170), Astrazone Orange R (C.I. 48040) and/or Astrazone Orange G (C.I. 48035), and one or more further compounds or sensitizers selected from the group consisting of the naphtholactam dyes which contain one or more chromophores of the general basic structure

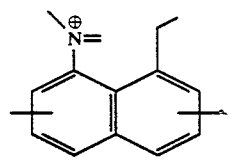

and the isoindolenine dyes which contain one or more chromophores of the general basic structure

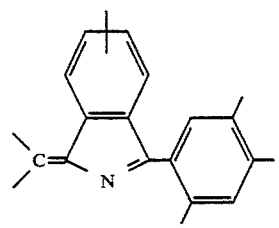

and
  ($b_3$) one or more charge carrier-transporting compounds (photoconductors);
 (ii) developing the latent electrostatic charge image by means of a toner, resulting in a toner-containing image,
 (iii) fixing the toner-containing image by heating and
 (iv) washing away (stripping) the toner-free nonimage areas of the electrophotographic recording element with a developer, with the result that the surface of the electrically conducting substrate (A) to be etched is bared and the said photoresist image is obtained.

17. A process as defined in claim 16, wherein development (ii) is carried out with an etchant-resistant toner which contrast visually with the surface of the electrophotographic recording element.

18. A process as defined in claim 17, wherein an etchant-resistant pale liquid toner is used.

19. A reprographic method for the production of photocopies, the said process comprising the steps of
 (i) imagewise exposure of a negatively or positively charged electrophotographic recording element to actinic light, with the result that a latent electrostatic charge image is produced, the said electrophotographic recording element comprising
  A) an electrically conducting substrate and
  B) one or more photoconducting layers consisting essentially of
  ($b_1$) one or more binders,
  ($b_2$) several charge carrier-producing compounds or sensitizers, one or more of which are selected from the group consisting of Victoria Blue FB (C.I. 44045), Crystal Violet FN (C.I. 42555), Rhodamine FB (C.I. 45170), Astrazone Orange R (C.I. 48040) and Astrazone Orange G (C.I. 48035), and one or more further compounds or sensitizers selected from the group consisting of the naphtholactam dyes which contain one or more chromophores of the general basic structure

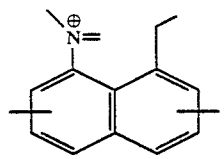

and the isoindolenine dyes which contain one or more chromophores of the general basic structure

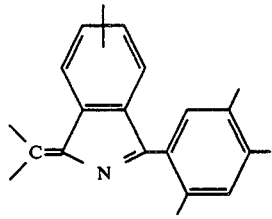

and (b₃) one or more charge carrier-transporting compounds (photoconductors);

(ii) developing the latent electrostatic charge image by means of a toner, resulting in a toner-containing image, and (iii) transfer of the toner image to another surface, resulting in the said photocopy.

20. A process as defined in claim 19, wherein development (ii) is carried out with a pale toner, after which the toner image is transferred to a dark surface in process step (iii).

* * * * *